US009509486B2

(12) United States Patent
Yerramalli et al.

(10) Patent No.: US 9,509,486 B2
(45) Date of Patent: Nov. 29, 2016

(54) TECHNIQUES FOR INDICATING A FRAME FORMAT FOR TRANSMISSIONS USING UNLICENSED RADIO FREQUENCY SPECTRUM BANDS

(71) Applicant: QUALCOMM Incorporated, San Diego, CA (US)

(72) Inventors: Srinivas Yerramalli, San Diego, CA (US); Tao Luo, San Diego, CA (US); Wanshi Chen, San Diego, CA (US); Xiaoxia Zhang, San Diego, CA (US); Durga Prasad Malladi, San Diego, CA (US); Yongbin Wei, La Jolla, CA (US); Peter Gaal, San Diego, CA (US); Aleksandar Damnjanovic, Del Mar, CA (US); Hao Xu, San Diego, CA (US); Shimman Arvind Patel, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/807,069

(22) Filed: Jul. 23, 2015

(65) Prior Publication Data

US 2016/0036581 A1 Feb. 4, 2016

Related U.S. Application Data

(60) Provisional application No. 62/032,953, filed on Aug. 4, 2014.

(51) Int. Cl.
*H04J 3/00* (2006.01)
*H04L 5/14* (2006.01)
(Continued)

(52) U.S. Cl.
CPC .............. *H04L 5/14* (2013.01); *H04L 27/20* (2013.01); *H04L 27/2607* (2013.01); *H04W 74/006* (2013.01)

(58) Field of Classification Search
None
See application file for complete search history.

(56) References Cited

U.S. PATENT DOCUMENTS

| 2013/0044651 A1* | 2/2013 | Wang | H04W 72/0406 370/280 |
| 2014/0003387 A1* | 1/2014 | Lee | H04L 5/001 370/330 |

(Continued)

FOREIGN PATENT DOCUMENTS

| EP | 2720401 A1 | 4/2014 |
| WO | WO-2012139278 A1 | 10/2012 |
| WO | WO-2014110691 A1 | 7/2014 |

OTHER PUBLICATIONS

ISA/EPO, International Search Report and Written Opinion of the International Searching Authority, Int'l. App. No. PCT/US2015/041922, Oct. 13, 2015, European Patent Office, Rijswijk, NL, 8 pgs.

(Continued)

*Primary Examiner* — Curtis A Alia
*Assistant Examiner* — Rebecca Song
(74) *Attorney, Agent, or Firm* — Holland & Hart LLP

(57) ABSTRACT

The present disclosure, for example, relates to one or more techniques for indicating a frame format for transmissions using unlicensed radio frequency spectrum bands. A UE may receive, from a base station, a frame format indicator associated with a transmission opportunity for transmissions in an unlicensed radio frequency spectrum band. The UE may determine a time-division duplexing (TDD) configuration for the transmission opportunity based at least in part on the frame format indicator.

30 Claims, 14 Drawing Sheets

(51) Int. Cl.
*H04L 27/26* (2006.01)
*H04L 27/20* (2006.01)
*H04W 74/00* (2009.01)

(56) References Cited

U.S. PATENT DOCUMENTS

| | | | |
|---|---|---|---|
| 2015/0003301 A1* | 1/2015 | He | H04B 7/0452 370/280 |
| 2015/0098411 A1* | 4/2015 | Jongren | H04L 5/0073 370/329 |
| 2015/0245246 A1* | 8/2015 | Golitschek Edler Von Elbwart | H04L 5/0094 370/280 |
| 2015/0305000 A1* | 10/2015 | Nguyen | H04L 1/1816 370/329 |

OTHER PUBLICATIONS

IPEA/EP, Second Written Opinion of the International Preliminary Examining Authority, Int'l App. No. PCT/US2015/041922, Jun. 29, 2016, European Patent Office, Rijswijk, NL, 4 pgs.

* cited by examiner

| No | Code | SF 0 | SF 1 | SF 2 | SF 3 | SF 4 | SF 5 | SF 6 | SF 7 | SF 8 | SF 9 |
|---|---|---|---|---|---|---|---|---|---|---|---|
| 0 | 0000 | D | S | U | U | U | U | U | U | U | S' |
| 1 | 0011 | D | D | S | U | U | U | U | U | U | S' |
| 2 | 0101 | D | D | D | S | U | U | U | U | U | S' |
| 3 | 0110 | D | D | D | D | S | U | U | U | U | S' |
| 4 | 1001 | D | D | D | D | D | S | U | U | U | S' |
| 5 | 1010 | D | D | D | D | D | D | S | U | U | S' |
| 6 | 1100 | D | D | D | D | D | D | D | S | U | S' |
| 7 | 1111 | D | D | D | D | D | D | D | D | D | S' |

FIG. 2

TECHNIQUES FOR INDICATING A FRAME FORMAT FOR TRANSMISSIONS USING UNLICENSED RADIO FREQUENCY SPECTRUM BANDS

CROSS REFERENCES

The present Application for Patent claims priority to U.S. Provisional Patent Application No. 62/032,953 by Yerramalli et al., entitled "Techniques for Indicating a Frame Format for Transmissions Using Unlicensed Radio Frequency Spectrum Bands," filed Aug. 4, 2014, assigned to the assignee hereof, which is hereby incorporated by reference in its entirety.

FIELD OF THE DISCLOSURE

The present disclosure, for example, relates to wireless communication systems, and more particularly to techniques for indicating a frame format for transmissions using unlicensed radio frequency spectrum bands.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications with a UE over different radio frequency spectrum bands (e.g., a licensed radio frequency spectrum band and/or an unlicensed radio frequency spectrum band) of a cellular network. With increasing data traffic in cellular networks, the offloading of at least some data traffic to an unlicensed radio frequency spectrum band may provide a cellular operator with opportunities for enhanced data transmission capacity. Prior to gaining access to, and communicating over, the unlicensed radio frequency spectrum band, a transmitting apparatus may, in some examples, implement a Listen Before Talk (LBT) protocol to gain access to the unlicensed radio frequency spectrum band. An LBT protocol may include performing a clear channel assessment (CCA) procedure to determine whether a channel of the unlicensed radio frequency spectrum band is available. The radio frames of various formats may be used for transmissions utilizing available channels of the unlicensed radio frequency spectrum band for uplink communications and downlink communications. Therefore, there is a need for techniques for indicating a frame format for transmissions using an unlicensed radio frequency spectrum band.

SUMMARY

The present disclosure, for example, relates to one or more techniques for indicating a frame format for transmissions using unlicensed radio frequency spectrum bands. A UE may receive, from a base station, a frame format indicator associated with a transmission opportunity for transmissions in an unlicensed radio frequency spectrum band. The UE may determine a time-division duplexing (TDD) configuration for the transmission opportunity based at least in part on the frame format indicator.

In an example, a method for wireless communication is described. In one example, the method may include receiving, from a base station, a frame format indicator associated with a transmission opportunity for transmissions in an unlicensed radio frequency spectrum band; and determining a time-division duplexing (TDD) configuration for the transmission opportunity based at least in part on the frame format indicator.

In some examples, the frame format indicator comprises a codeword associated with the TDD configuration. In some examples, the codeword is scrambled with a sequence associated with the base station. In some examples, the sequence is further associated with a public land mobile network (PLMN) identification. In some examples, the scrambled codeword is modulated with quadrature phase shift keying (QPSK). In some examples, the codeword is mapped to space frequency block code (SFBC) symbols associated with two antenna ports. In some examples, the two antenna ports correspond to antenna ports for channel usage beacon signal (CUBS) transmissions. In some examples, the SFBC symbols are mapped to an enhanced resource element group (eREG). In some examples, the method may include receiving the frame format indicator in a bit stream, wherein the length of the bit stream is determined by a number of cyclical extensions of the codeword.

In some examples, the codeword comprises repetitions of a code. In some examples, the code indicates the TDD configuration. In some examples, the code is based at least in part on a three bit word indicating the TDD configuration. In some examples, the code is further based at least in part on parity checks of the three bit word, the parity checks comprising XOR operations on the bits of the three bit word. In some examples, the code indicates a number of downlink subframes between two special subframes. In some examples, the frame format indicator is carried by at least one enhanced resource element group (eREG) of a resource block (RB). In some examples, the RB is one of a plurality of RBs of a channel of the unlicensed radio frequency spectrum band, the plurality of RBs omitting RBs located at edges of the channel and at a direct current (DC) carrier of the channel. In some examples, the frame format indicator is multiplexed with a second frame format indicator from a second base station.

In some examples, the method may include receiving the frame format indicator in a orthogonal frequency division multiplexing (OFDM) symbol before a downlink subframe of the transmission opportunity. In some examples, the OFDM symbol comprises a channel usage beacon signal (CUBS). In some examples, the method may include receiving the frame format indicator before a first subframe of the transmission opportunity. In some examples, the method may include receiving the frame format indicator during a middle portion of the transmission opportunity. In some examples, the method may include decoding the frame format indicator before an end of a first downlink subframe of the transmission opportunity. In some examples, the method may include receiving a second frame format indicator during a subframe of the transmission opportunity; and invalidating the second frame format indicator based at least in part on which subframe the second frame format indicator is received. In some examples, the TDD configuration comprises at least one uplink subframe corresponding to a cross-carrier grant from a primary cell. In some examples, the cross-carrier grant occurred at least four subframes before the uplink subframe.

In some examples, the TDD configuration comprises at least one uplink subframe corresponding to a self-scheduled uplink grant. In some examples, the self-scheduled uplink grant occurred more than four subframes before the uplink subframe. In some examples, the TDD configuration is based at least in part on an extended clear channel assessment (eCCA) of the base station. In some examples, the eCCA of the base station is completed at least four subframes before an uplink subframe of the TDD configuration. In some examples, the TDD configuration comprises at least one downlink subframe and at least one uplink subframe. In some examples, the TDD configuration further comprises a first special subframe and a second special subframe, the first special subframe comprising an uplink channel usage beacon signal (U-CUBS), and the second special subframe comprising a downlink channel usage beacon signal (D-CUBS). In some examples, an uplink subframe follows the first special subframe, and a downlink subframe follows the second special subframe.

In an example, a method for wireless communication is described. In one example, the method may include determining a time-division duplexing (TDD) configuration for a transmission opportunity for transmissions in an unlicensed radio frequency spectrum band; and transmitting, to a UE, a frame format indicator associated with the transmission opportunity, the frame format indicator being based at least in part on the TDD configuration.

In some examples, the frame format indicator comprises a codeword associated with the TDD configuration. In some examples, the method may include scrambling the codeword with a sequence associated with a base station. In some examples, the sequence is further associated with a public land mobile network (PLMN) identification. In some examples, the method may include modulating the scrambled codeword with quadrature phase shift keying (QPSK). In some examples, the method may include mapping the codeword to space frequency block code (SFBC) symbols associated with two antenna ports. In some examples, the two antenna ports correspond to antenna ports for channel usage beacon signal (CUBS) transmissions. In some examples, the SFBC symbols are mapped to an enhanced resource element group (eREG). In some examples, the method may include cyclically extending the codeword a number of times; and transmitting the frame format indicator in a bit stream, wherein the length of the bit stream is determined by the number of cyclical extensions of the codeword.

In some examples, the codeword may include repetitions of a code. In some examples, the code indicates the TDD configuration. In some examples, the code is based at least in part on a three bit word indicating the TDD configuration. In some examples, the code is further based at least in part on parity checks of the three bit word, the parity checks comprising XOR operations on the bits of the three bit word. In some examples, the code indicates a number of downlink subframes between two special subframes. In some examples, the frame format indicator is carried by at least one enhanced resource element group (eREG) of a resource block (RB). In some examples, the RB is one of a plurality of RBs of a channel of the unlicensed radio frequency spectrum band, the plurality of RBs omitting RBs located at edges of the channel and at a direct current (DC) carrier of the channel. In some examples, the method may include multiplexing the frame format indicator with a second frame format indicator from a second base station.

In some examples, the method may include transmitting the frame format indicator in a orthogonal frequency division multiplexing (OFDM) symbol before a downlink subframe of the transmission opportunity. In some examples, the OFDM symbol comprises a channel usage beacon signal (CUBS). In some examples, the method may include transmitting the frame format indicator before a first subframe of the transmission opportunity. In some examples, the method may include transmitting the frame format indicator during a middle portion of the transmission opportunity. In some examples, the method may include transmitting a second frame format indicator during a subframe of the transmission opportunity. In some examples, the TDD configuration comprises at least one uplink subframe corresponding to a cross-carrier grant from a primary cell. In some examples, the cross-carrier grant occurred at least four subframes before the uplink subframe. In some examples, the TDD configuration comprises at least one uplink subframe corresponding to a self-scheduled uplink grant. In some examples, the self-scheduled uplink grant occurred more than four subframes before the uplink subframe. In some examples, the method may include performing an extended clear channel assessment (eCCA); and determining the TDD configuration based at least in part on the eCCA. In some examples, the eCCA is completed at least four subframes before an uplink subframe of the TDD configuration.

In some examples, the TDD configuration comprises at least one downlink subframe and at least one uplink subframe. In some examples, the TDD configuration further comprises a first special subframe and a second special subframe, the first special subframe comprising an uplink channel usage beacon signal (U-CUBS), and the second special subframe comprising a downlink channel usage beacon signal (D-CUBS). In some examples, an uplink subframe follows the first special subframe, and a downlink subframe follows the second special subframe.

In an example, a method for wireless communication is described. In one example, the method may include identifying a plurality of TDD configurations, wherein each of the plurality of TDD configurations comprises different numbers of uplink subframes and downlink subframes; and identifying an available TDD configuration from the plurality of TDD configurations, wherein the available TDD configuration is indicated by a frame format indicator.

In some examples, each of the plurality of TDD configurations comprises ten subframes. In some examples, each of the plurality of TDD configurations comprises at least one special subframe. In some examples, a first subframe of each of the plurality of TDD configurations comprises a downlink subframe. In some examples, a last subframe of each of the plurality of TDD configurations comprises a special subframe.

In some examples, the plurality of TDD configurations comprise: a first TDD configuration comprising one downlink subframe, a first special subframe, seven uplink subframes, and a second special subframe; a second TDD configuration comprising two downlink subframes, a first special subframe, six uplink subframes, and a second special subframe; a third TDD configuration comprising three downlink subframes, a first special subframe, five uplink subframes, and a second special subframe; a fourth TDD configuration comprising four downlink subframes, a first special subframe, four uplink subframes, and a second special subframe; a fifth TDD configuration comprising five downlink subframes, a first special subframe, three uplink subframes, and a second special subframe; a sixth TDD configuration comprising six downlink subframes, a first special subframe, two uplink subframes, and a second special subframe; a seventh TDD configuration comprising seven downlink subframes, a first special subframe, one uplink subframes, and a second special subframe; and an eighth TDD configuration comprising nine downlink subframes and a second special subframe. In some examples, the first special subframe comprises an uplink channel usage beacon signal (U-CUBS), and the second special subframe comprises a downlink channel usage beacon signal (D-CUBS).

In an example, an apparatus for wireless communication is described. In one example, the apparatus may include a processor, memory in electronic communication with the processor, and instructions stored in the memory. The instructions may be executable by the processor to receive, from a base station, a frame format indicator associated with a transmission opportunity for transmissions in an unlicensed radio frequency spectrum band; and determine a time-division duplexing (TDD) configuration for the transmission opportunity based at least in part on the frame format indicator.

In some examples, the frame format indicator comprises a codeword associated with the TDD configuration. In some examples, the codeword is scrambled with a sequence associated with the base station. In some examples, the sequence is further associated with a public land mobile network (PLMN) identification. In some examples, the scrambled codeword is modulated with quadrature phase shift keying (QPSK). In some examples, the codeword is mapped to space frequency block code (SFBC) symbols associated with two antenna ports. In some examples, the two antenna ports correspond to antenna ports for channel usage beacon signal (CUBS) transmissions. In some examples, the SFBC symbols are mapped to an enhanced resource element group (eREG). In some examples of the apparatus, the instructions may also be executable by the processor to receive the frame format indicator in a bit stream, wherein the length of the bit stream is determined by a number of cyclical extensions of the codeword.

In some examples, the codeword comprises repetitions of a code. In some examples, the code indicates the TDD configuration. In some examples, the code is based at least in part on a three bit word indicating the TDD configuration. In some examples, the code is further based at least in part on parity checks of the three bit word, the parity checks comprising XOR operations on the bits of the three bit word. In some examples, the code indicates a number of downlink subframes between two special subframes. In some examples, the frame format indicator is carried by at least one enhanced resource element group (eREG) of a resource block (RB). In some examples, the RB is one of a plurality of RBs of a channel of the unlicensed radio frequency spectrum band, the plurality of RBs omitting RBs located at edges of the channel and at a direct current (DC) carrier of the channel. In some examples, the frame format indicator is multiplexed with a second frame format indicator from a second base station.

In some examples of the apparatus, the instructions may also be executable by the processor to receive the frame format indicator in a orthogonal frequency division multiplexing (OFDM) symbol before a downlink subframe of the transmission opportunity. In some examples, the OFDM symbol comprises a channel usage beacon signal (CUBS). In some examples of the apparatus, the instructions may also be executable by the processor to receive the frame format indicator before a first subframe of the transmission opportunity. In some examples of the apparatus, the instructions may also be executable by the processor to receive the frame format indicator during a middle portion of the transmission opportunity. In some examples of the apparatus, the instructions may also be executable by the processor to decode the frame format indicator before an end of a first downlink subframe of the transmission opportunity. In some examples of the apparatus, the instructions may also be executable by the processor to receive a second frame format indicator during a subframe of the transmission opportunity; and invalidate the second frame format indicator based at least in part on which subframe the second frame format indicator is received. In some examples, the TDD configuration comprises at least one uplink subframe corresponding to a cross-carrier grant from a primary cell. In some examples, the cross-carrier grant occurred at least four subframes before the uplink subframe.

In some examples, the TDD configuration comprises at least one uplink subframe corresponding to a self-scheduled uplink grant. In some examples, the self-scheduled uplink grant occurred more than four subframes before the uplink subframe. In some examples, the TDD configuration is based at least in part on an extended clear channel assessment (eCCA) of the base station. In some examples, the eCCA of the base station is completed at least four subframes before an uplink subframe of the TDD configuration. In some examples, the TDD configuration comprises at least one downlink subframe and at least one uplink subframe. In some examples, the TDD configuration further comprises a first special subframe and a second special subframe, the first special subframe comprising an uplink channel usage beacon signal (U-CUBS), and the second special subframe comprising a downlink channel usage beacon signal (D-CUBS). In some examples, an uplink subframe follows the first special subframe, and a downlink subframe follows the second special subframe.

In an example, an apparatus for wireless communication is described. In one example, the apparatus may include a processor, memory in electronic communication with the processor, and instructions stored in the memory. The instructions may be executable by the processor to determine a time-division duplexing (TDD) configuration for a transmission opportunity for transmissions in an unlicensed radio frequency spectrum band; and transmit, to a UE, a frame format indicator associated with the transmission opportunity, the frame format indicator being based at least in part on the TDD configuration.

In some examples, the frame format indicator comprises a codeword associated with the TDD configuration. In some examples of the apparatus, the instructions may also be executable by the processor to scramble the codeword with a sequence associated with a base station. In some examples, the sequence is further associated with a public land mobile network (PLMN) identification. In some examples of the apparatus, the instructions may also by executable by the processor to modulate the scrambled codeword with quadrature phase shift keying (QPSK). In some examples of the apparatus, the instructions may also be executable by the processor to map the codeword to space frequency block code (SFBC) symbols associated with two antenna ports. In some examples, the two antenna ports correspond to antenna ports for channel usage beacon signal (CUBS) transmissions. In some examples, the SFBC symbols are mapped to an enhanced resource element group (eREG). In some examples of the apparatus, the instructions may also be executable by the processor to cyclically extend the codeword a number of times; and transmit the frame format indicator in a bit stream, wherein the length of the bit stream is determined by the number of cyclical extensions of the codeword.

In some examples, the codeword may include repetitions of a code. In some examples, the code indicates the TDD configuration. In some examples, the code is based at least in part on a three bit word indicating the TDD configuration. In some examples, the code is further based at least in part on parity checks of the three bit word, the parity checks comprising XOR operations on the bits of the three bit word. In some examples, the code indicates a number of downlink subframes between two special subframes. In some examples, the frame format indicator is carried by at least one enhanced resource element group (eREG) of a resource block (RB). In some examples, the RB is one of a plurality of RBs of a channel of the unlicensed radio frequency spectrum band, the plurality of RBs omitting RBs located at edges of the channel and at a direct current (DC) carrier of the channel. In some examples of the apparatus, the instructions may also be executable by the processor to multiplex the frame format indicator with a second frame format indicator from a second base station.

In some examples of the apparatus, the instructions may also be executable by the processor to transmit the frame format indicator in a orthogonal frequency division multiplexing (OFDM) symbol before a downlink subframe of the transmission opportunity. In some examples, the OFDM symbol comprises a channel usage beacon signal (CUBS). In some examples of the apparatus, the instructions may also be executable by the processor to transmit the frame format indicator before a first subframe of the transmission opportunity. In some examples of the apparatus, the instructions may also be executable by the processor to transmit the frame format indicator during a middle portion of the transmission opportunity. In some examples of the apparatus, the instructions may also be executable by the processor to transmit a second frame format indicator during a subframe of the transmission opportunity. In some examples, the TDD configuration comprises at least one uplink subframe corresponding to a cross-carrier grant from a primary cell. In some examples, the cross-carrier grant occurred at least four subframes before the uplink subframe. In some examples, the TDD configuration comprises at least one uplink subframe corresponding to a self-scheduled uplink grant. In some examples, the self-scheduled uplink grant occurred more than four subframes before the uplink subframe. In some examples of the apparatus, the instructions may also be executable by the processor to perform an extended clear channel assessment (eCCA); and determine the TDD configuration based at least in part on the eCCA. In some examples, the eCCA is completed at least four subframes before an uplink subframe of the TDD configuration.

In some examples, the TDD configuration comprises at least one downlink subframe and at least one uplink subframe. In some examples, the TDD configuration further comprises a first special subframe and a second special subframe, the first special subframe comprising an uplink channel usage beacon signal (U-CUBS), and the second special subframe comprising a downlink channel usage beacon signal (D-CUBS). In some examples, an uplink subframe follows the first special subframe, and a downlink subframe follows the second special subframe.

In an example, an apparatus for wireless communication is described. In one example, the apparatus may include a processor, memory in electronic communication with the processor, and instructions stored in the memory. The instructions may be executable by the processor to identify a plurality of TDD configurations, wherein each of the plurality of TDD configurations comprises different numbers of uplink subframes and downlink subframes; and identify an available TDD configuration from the plurality of TDD configurations, wherein the available TDD configuration is indicated by a frame format indicator.

In some examples, each of the plurality of TDD configurations comprises ten subframes. In some examples, each of the plurality of TDD configurations comprises at least one special subframe. In some examples, a first subframe of each of the plurality of TDD configurations comprises a downlink subframe. In some examples, a last subframe of each of the plurality of TDD configurations comprises a special subframe.

In some examples, the plurality of TDD configurations comprise: a first TDD configuration comprising one downlink subframe, a first special subframe, seven uplink subframes, and a second special subframe; a second TDD configuration comprising two downlink subframes, a first special subframe, six uplink subframes, and a second special subframe; a third TDD configuration comprising three downlink subframes, a first special subframe, five uplink subframes, and a second special subframe; a fourth TDD configuration comprising four downlink subframes, a first special subframe, four uplink subframes, and a second special subframe; a fifth TDD configuration comprising five downlink subframes, a first special subframe, three uplink subframes, and a second special subframe; a sixth TDD configuration comprising six downlink subframes, a first special subframe, two uplink subframes, and a second special subframe; a seventh TDD configuration comprising seven downlink subframes, a first special subframe, one uplink subframes, and a second special subframe; and an eighth TDD configuration comprising nine downlink subframes and a second special subframe. In some examples, the first special subframe comprises an uplink channel usage beacon signal (U-CUBS), and the second special subframe comprises a downlink channel usage beacon signal (D-CUBS).

In an example, another apparatus for wireless communication is described. In one example, the apparatus may include means for receiving, from a base station, a frame format indicator associated with a transmission opportunity for transmissions in an unlicensed radio frequency spectrum band; and means for determining a time-division duplexing (TDD) configuration for the transmission opportunity based at least in part on the frame format indicator.

In some examples, the frame format indicator comprises a codeword associated with the TDD configuration. In some examples, the codeword is scrambled with a sequence associated with the base station. In some examples, the sequence is further associated with a public land mobile network (PLMN) identification. In some examples, the scrambled codeword is modulated with quadrature phase shift keying (QPSK). In some examples, the codeword is mapped to space frequency block code (SFBC) symbols associated with two antenna ports. In some examples, the two antenna ports correspond to antenna ports for channel usage beacon signal (CUBS) transmissions. In some examples, the SFBC symbols are mapped to an enhanced resource element group (eREG). In some examples, the apparatus may include means for receiving the frame format indicator in a bit stream, wherein the length of the bit stream is determined by a number of cyclical extensions of the codeword.

In some examples, the codeword comprises repetitions of a code. In some examples, the code indicates the TDD configuration. In some examples, the code is based at least in part on a three bit word indicating the TDD configuration. In some examples, the code is further based at least in part on parity checks of the three bit word, the parity checks comprising XOR operations on the bits of the three bit word. In some examples, the code indicates a number of downlink subframes between two special subframes. In some examples, the frame format indicator is carried by at least one enhanced resource element group (eREG) of a resource block (RB). In some examples, the RB is one of a plurality of RBs of a channel of the unlicensed radio frequency spectrum band, the plurality of RBs omitting RBs located at edges of the channel and at a direct current (DC) carrier of the channel. In some examples, the frame format indicator is multiplexed with a second frame format indicator from a second base station.

In some examples, the apparatus may include means for receiving the frame format indicator in a orthogonal frequency division multiplexing (OFDM) symbol before a downlink subframe of the transmission opportunity. In some examples, the OFDM symbol comprises a channel usage beacon signal (CUBS). In some examples, the apparatus may include means for receiving the frame format indicator before a first subframe of the transmission opportunity. In some examples, the apparatus may include means for receiving the frame format indicator during a middle portion of the transmission opportunity. In some examples, the apparatus may include means for decoding the frame format indicator before an end of a first downlink subframe of the transmission opportunity. In some examples, the apparatus may include means for receiving a second frame format indicator during a subframe of the transmission opportunity; and invalidating the second frame format indicator based at least in part on which subframe the second frame format indicator is received. In some examples, the TDD configuration comprises at least one uplink subframe corresponding to a cross-carrier grant from a primary cell. In some examples, the cross-carrier grant occurred at least four subframes before the uplink subframe.

In some examples, the TDD configuration comprises at least one uplink subframe corresponding to a self-scheduled uplink grant. In some examples, the self-scheduled uplink grant occurred more than four subframes before the uplink subframe. In some examples, the TDD configuration is based at least in part on an extended clear channel assessment (eCCA) of the base station. In some examples, the eCCA of the base station is completed at least four subframes before an uplink subframe of the TDD configuration. In some examples, the TDD configuration comprises at least one downlink subframe and at least one uplink subframe. In some examples, the TDD configuration further comprises a first special subframe and a second special subframe, the first special subframe comprising an uplink channel usage beacon signal (U-CUBS), and the second special subframe comprising a downlink channel usage beacon signal (D-CUBS). In some examples, an uplink subframe follows the first special subframe, and a downlink subframe follows the second special subframe.

In an example, another apparatus for wireless communication is described. In one example, the apparatus may include means for determining a time-division duplexing (TDD) configuration for a transmission opportunity for transmissions in an unlicensed radio frequency spectrum band; and means for transmitting, to a UE, a frame format indicator associated with the transmission opportunity, the frame format indicator being based at least in part on the TDD configuration.

In some examples, the frame format indicator comprises a codeword associated with the TDD configuration. In some examples, the apparatus may include means for scrambling the codeword with a sequence associated with a base station. In some examples, the sequence is further associated with a public land mobile network (PLMN) identification. In some examples, the apparatus may include means for modulating the scrambled codeword with quadrature phase shift keying (QPSK). In some examples, the apparatus may include means for mapping the codeword to space frequency block code (SFBC) symbols associated with two antenna ports. In some examples, the two antenna ports correspond to antenna ports for channel usage beacon signal (CUBS) transmissions. In some examples, the SFBC symbols are mapped to an enhanced resource element group (eREG). In some examples, the apparatus may include means for cyclically extending the codeword a number of times; and means for transmitting the frame format indicator in a bit stream, wherein the length of the bit stream is determined by the number of cyclical extensions of the codeword.

In some examples, the codeword may include repetitions of a code. In some examples, the code indicates the TDD configuration. In some examples, the code is based at least in part on a three bit word indicating the TDD configuration. In some examples, the code is further based at least in part on parity checks of the three bit word, the parity checks comprising XOR operations on the bits of the three bit word. In some examples, the code indicates a number of downlink subframes between two special subframes. In some examples, the frame format indicator is carried by at least one enhanced resource element group (eREG) of a resource block (RB). In some examples, the RB is one of a plurality of RBs of a channel of the unlicensed radio frequency spectrum band, the plurality of RBs omitting RBs located at edges of the channel and at a direct current (DC) carrier of the channel. In some examples, the apparatus may include means for multiplexing the frame format indicator with a second frame format indicator from a second base station.

In some examples, the apparatus may include means for transmitting the frame format indicator in a orthogonal frequency division multiplexing (OFDM) symbol before a downlink subframe of the transmission opportunity. In some examples, the OFDM symbol comprises a channel usage beacon signal (CUBS). In some examples, the apparatus may include means for transmitting the frame format indicator before a first subframe of the transmission opportunity. In some examples, the apparatus may include means for transmitting the frame format indicator during a middle portion of the transmission opportunity. In some examples, the apparatus may include means for transmitting a second frame format indicator during a subframe of the transmission opportunity. In some examples, the TDD configuration comprises at least one uplink subframe corresponding to a cross-carrier grant from a primary cell. In some examples, the cross-carrier grant occurred at least four subframes before the uplink subframe. In some examples, the TDD configuration comprises at least one uplink subframe corresponding to a self-scheduled uplink grant. In some examples, the self-scheduled uplink grant occurred more than four subframes before the uplink subframe. In some examples, the apparatus may include means for performing an extended clear channel assessment (eCCA); and means for determining the TDD configuration based at least in part on the eCCA. In some examples, the eCCA is completed at least four subframes before an uplink subframe of the TDD configuration.

In some examples, the TDD configuration comprises at least one downlink subframe and at least one uplink subframe. In some examples, the TDD configuration further comprises a first special subframe and a second special subframe, the first special subframe comprising an uplink channel usage beacon signal (U-CUBS), and the second special subframe comprising a downlink channel usage beacon signal (D-CUBS). In some examples, an uplink subframe follows the first special subframe, and a downlink subframe follows the second special subframe.

In an example, another apparatus for wireless communication is described. In one example, the apparatus may include means for identifying a plurality of TDD configurations, wherein each of the plurality of TDD configurations comprises different numbers of uplink subframes and downlink subframes; and means for identifying an available TDD configuration from the plurality of TDD configurations, wherein the available TDD configuration is indicated by a frame format indicator.

In some examples, each of the plurality of TDD configurations comprises ten subframes. In some examples, each of the plurality of TDD configurations comprises at least one special subframe. In some examples, a first subframe of each of the plurality of TDD configurations comprises a downlink subframe. In some examples, a last subframe of each of the plurality of TDD configurations comprises a special subframe.

In some examples, the plurality of TDD configurations comprise: a first TDD configuration comprising one downlink subframe, a first special subframe, seven uplink subframes, and a second special subframe; a second TDD configuration comprising two downlink subframes, a first special subframe, six uplink subframes, and a second special subframe; a third TDD configuration comprising three downlink subframes, a first special subframe, five uplink subframes, and a second special subframe; a fourth TDD configuration comprising four downlink subframes, a first special subframe, four uplink subframes, and a second special subframe; a fifth TDD configuration comprising five downlink subframes, a first special subframe, three uplink subframes, and a second special subframe; a sixth TDD configuration comprising six downlink subframes, a first special subframe, two uplink subframes, and a second special subframe; a seventh TDD configuration comprising seven downlink subframes, a first special subframe, one uplink subframes, and a second special subframe; and an eighth TDD configuration comprising nine downlink subframes and a second special subframe. In some examples, the first special subframe comprises an uplink channel usage beacon signal (U-CUBS), and the second special subframe comprises a downlink channel usage beacon signal (D-CUBS).

In an example, a non-transitory computer-readable medium storing computer-executable code for wireless communication is described. In one example, the code may be executable by a processor to receive, from a base station, a frame format indicator associated with a transmission opportunity for transmissions in an unlicensed radio frequency spectrum band; and determine a time-division duplexing (TDD) configuration for the transmission opportunity based at least in part on the frame format indicator.

In some examples, the frame format indicator comprises a codeword associated with the TDD configuration. In some examples, the codeword is scrambled with a sequence associated with the base station. In some examples, the sequence is further associated with a public land mobile network (PLMN) identification. In some examples, the scrambled codeword is modulated with quadrature phase shift keying (QPSK). In some examples, the codeword is mapped to space frequency block code (SFBC) symbols associated with two antenna ports. In some examples, the two antenna ports correspond to antenna ports for channel usage beacon signal (CUBS) transmissions. In some examples, the SFBC symbols are mapped to an enhanced resource element group (eREG). In some examples of the non-transitory computer-readable medium, the code may also be executable by the processor to receive the frame format indicator in a bit stream, wherein the length of the bit stream is determined by a number of cyclical extensions of the codeword.

In some examples, the codeword comprises repetitions of a code. In some examples, the code indicates the TDD configuration. In some examples, the code is based at least in part on a three bit word indicating the TDD configuration. In some examples, the code is further based at least in part on parity checks of the three bit word, the parity checks comprising XOR operations on the bits of the three bit word. In some examples, the code indicates a number of downlink subframes between two special subframes. In some examples, the frame format indicator is carried by at least one enhanced resource element group (eREG) of a resource block (RB). In some examples, the RB is one of a plurality of RBs of a channel of the unlicensed radio frequency spectrum band, the plurality of RBs omitting RBs located at edges of the channel and at a direct current (DC) carrier of the channel. In some examples, the frame format indicator is multiplexed with a second frame format indicator from a second base station.

In some examples of the non-transitory computer-readable medium, the code may also be executable by the processor to receive the frame format indicator in a orthogonal frequency division multiplexing (OFDM) symbol before a downlink subframe of the transmission opportunity. In some examples, the OFDM symbol comprises a channel usage beacon signal (CUBS). In some examples of the non-transitory computer-readable medium, the code may also be executable by the processor to receive the frame format indicator before a first subframe of the transmission opportunity. In some examples of the non-transitory computer-readable medium, the code may also be executable by the processor to receive the frame format indicator during a middle portion of the transmission opportunity. In some examples of the non-transitory computer-readable medium, the code may also be executable by the processor to decode the frame format indicator before an end of a first downlink subframe of the transmission opportunity. In some examples of the non-transitory computer-readable medium, the code may also be executable by the processor to receive a second frame format indicator during a subframe of the transmission opportunity; and invalidate the second frame format indicator based at least in part on which subframe the second frame format indicator is received. In some examples, the TDD configuration comprises at least one uplink subframe corresponding to a cross-carrier grant from a primary cell. In some examples, the cross-carrier grant occurred at least four subframes before the uplink subframe.

In some examples, the TDD configuration comprises at least one uplink subframe corresponding to a self-scheduled uplink grant. In some examples, the self-scheduled uplink grant occurred more than four subframes before the uplink subframe. In some examples, the TDD configuration is based at least in part on an extended clear channel assessment (eCCA) of the base station. In some examples, the eCCA of the base station is completed at least four subframes before an uplink subframe of the TDD configuration. In some examples, the TDD configuration comprises at least one downlink subframe and at least one uplink subframe. In some examples, the TDD configuration further comprises a first special subframe and a second special subframe, the first special subframe comprising an uplink channel usage beacon signal (U-CUBS), and the second special subframe comprising a downlink channel usage beacon signal (D-CUBS). In some examples, an uplink subframe follows the first special subframe, and a downlink subframe follows the second special subframe.

In an example, a non-transitory computer-readable medium storing computer-executable code for wireless communication is described. In one example, the code may be executable by a processor to determine a time-division duplexing (TDD) configuration for a transmission opportunity for transmissions in an unlicensed radio frequency spectrum band; and transmit, to a UE, a frame format indicator associated with the transmission opportunity, the frame format indicator being based at least in part on the TDD configuration.

In some examples, the frame format indicator comprises a codeword associated with the TDD configuration. In some examples of the non-transitory computer-readable medium, the code may also be executable by the processor to scramble the codeword with a sequence associated with a base station. In some examples, the sequence is further associated with a public land mobile network (PLMN) identification. In some examples of the non-transitory computer-readable medium, the code may also by executable by the processor to modulate the scrambled codeword with quadrature phase shift keying (QPSK). In some examples of the non-transitory computer-readable medium, the code may also be executable by the processor to map the codeword to space frequency block code (SFBC) symbols associated with two antenna ports. In some examples, the two antenna ports correspond to antenna ports for channel usage beacon signal (CUBS) transmissions. In some examples, the SFBC symbols are mapped to an enhanced resource element group (eREG). In some examples of the non-transitory computer-readable medium, the code may also be executable by the processor to cyclically extend the codeword a number of times; and transmit the frame format indicator in a bit stream, wherein the length of the bit stream is determined by the number of cyclical extensions of the codeword.

In some examples, the codeword may include repetitions of a code. In some examples, the code indicates the TDD configuration. In some examples, the code is based at least in part on a three bit word indicating the TDD configuration. In some examples, the code is further based at least in part on parity checks of the three bit word, the parity checks comprising XOR operations on the bits of the three bit word. In some examples, the code indicates a number of downlink subframes between two special subframes. In some examples, the frame format indicator is carried by at least one enhanced resource element group (eREG) of a resource block (RB). In some examples, the RB is one of a plurality of RBs of a channel of the unlicensed radio frequency spectrum band, the plurality of RBs omitting RBs located at edges of the channel and at a direct current (DC) carrier of the channel. In some examples of the non-transitory computer-readable medium, the code may also be executable by the processor to multiplex the frame format indicator with a second frame format indicator from a second base station.

In some examples of the non-transitory computer-readable medium, the code may also be executable by the processor to transmit the frame format indicator in a orthogonal frequency division multiplexing (OFDM) symbol before a downlink subframe of the transmission opportunity. In some examples, the OFDM symbol comprises a channel usage beacon signal (CUBS). In some examples of the non-transitory computer-readable medium, the code may also be executable by the processor to transmit the frame format indicator before a first subframe of the transmission opportunity. In some examples of the non-transitory computer-readable medium, the code may also be executable by the processor to transmit the frame format indicator during a middle portion of the transmission opportunity. In some examples of the non-transitory computer-readable medium, the code may also be executable by the processor to transmit a second frame format indicator during a subframe of the transmission opportunity. In some examples, the TDD configuration comprises at least one uplink subframe corresponding to a cross-carrier grant from a primary cell. In some examples, the cross-carrier grant occurred at least four subframes before the uplink subframe. In some examples, the TDD configuration comprises at least one uplink subframe corresponding to a self-scheduled uplink grant. In some examples, the self-scheduled uplink grant occurred more than four subframes before the uplink subframe. In some examples of the non-transitory computer-readable medium, the code may also be executable by the processor to perform an extended clear channel assessment (eCCA); and determine the TDD configuration based at least in part on the eCCA. In some examples, the eCCA is completed at least four subframes before an uplink subframe of the TDD configuration.

In some examples, the TDD configuration comprises at least one downlink subframe and at least one uplink subframe. In some examples, the TDD configuration further comprises a first special subframe and a second special subframe, the first special subframe comprising an uplink channel usage beacon signal (U-CUBS), and the second special subframe comprising a downlink channel usage beacon signal (D-CUBS). In some examples, an uplink subframe follows the first special subframe, and a downlink subframe follows the second special subframe.

In an example, a non-transitory computer-readable medium storing computer-executable code for wireless communication is described. In one example, the code may be executable by a processor to identify a plurality of TDD configurations, wherein each of the plurality of TDD configurations comprises different numbers of uplink subframes and downlink subframes; and identify an available TDD configuration from the plurality of TDD configurations, wherein the available TDD configuration is indicated by a frame format indicator.

In some examples, each of the plurality of TDD configurations comprises ten subframes. In some examples, each of the plurality of TDD configurations comprises at least one special subframe. In some examples, a first subframe of each of the plurality of TDD configurations comprises a downlink subframe. In some examples, a last subframe of each of the plurality of TDD configurations comprises a special subframe.

In some examples, the plurality of TDD configurations comprise: a first TDD configuration comprising one downlink subframe, a first special subframe, seven uplink subframes, and a second special subframe; a second TDD configuration comprising two downlink subframes, a first special subframe, six uplink subframes, and a second special subframe; a third TDD configuration comprising three downlink subframes, a first special subframe, five uplink subframes, and a second special subframe; a fourth TDD configuration comprising four downlink subframes, a first special subframe, four uplink subframes, and a second special subframe; a fifth TDD configuration comprising five downlink subframes, a first special subframe, three uplink subframes, and a second special subframe; a sixth TDD configuration comprising six downlink subframes, a first special subframe, two uplink subframes, and a second special subframe; a seventh TDD configuration comprising seven downlink subframes, a first special subframe, one uplink subframes, and a second special subframe; and an eighth TDD configuration comprising nine downlink subframes and a second special subframe. In some examples, the first special subframe comprises an uplink channel usage beacon signal (U-CUBS), and the second special subframe comprises a downlink channel usage beacon signal (D-CUBS).

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2 shows a table illustrating examples of TDD configurations that may be applicable for a radio frame, in accordance with various aspects of the present disclosure;

DETAILED DESCRIPTION

When communicating over an unlicensed radio frequency spectrum band, the channels available for communication may change on a radio frame by radio frame basis. Based on when a channel becomes available during a radio frame, a time-division duplexing (TDD) configuration for the radio frame, or transmission opportunity, may be determined. A UE may receive, from a base station, a frame format indicator associated with the transmission opportunity, or radio frame, for transmissions in the unlicensed radio frequency spectrum band. The UE may determine the TDD configuration for the transmission opportunity based at least in part on the received frame format indicator.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
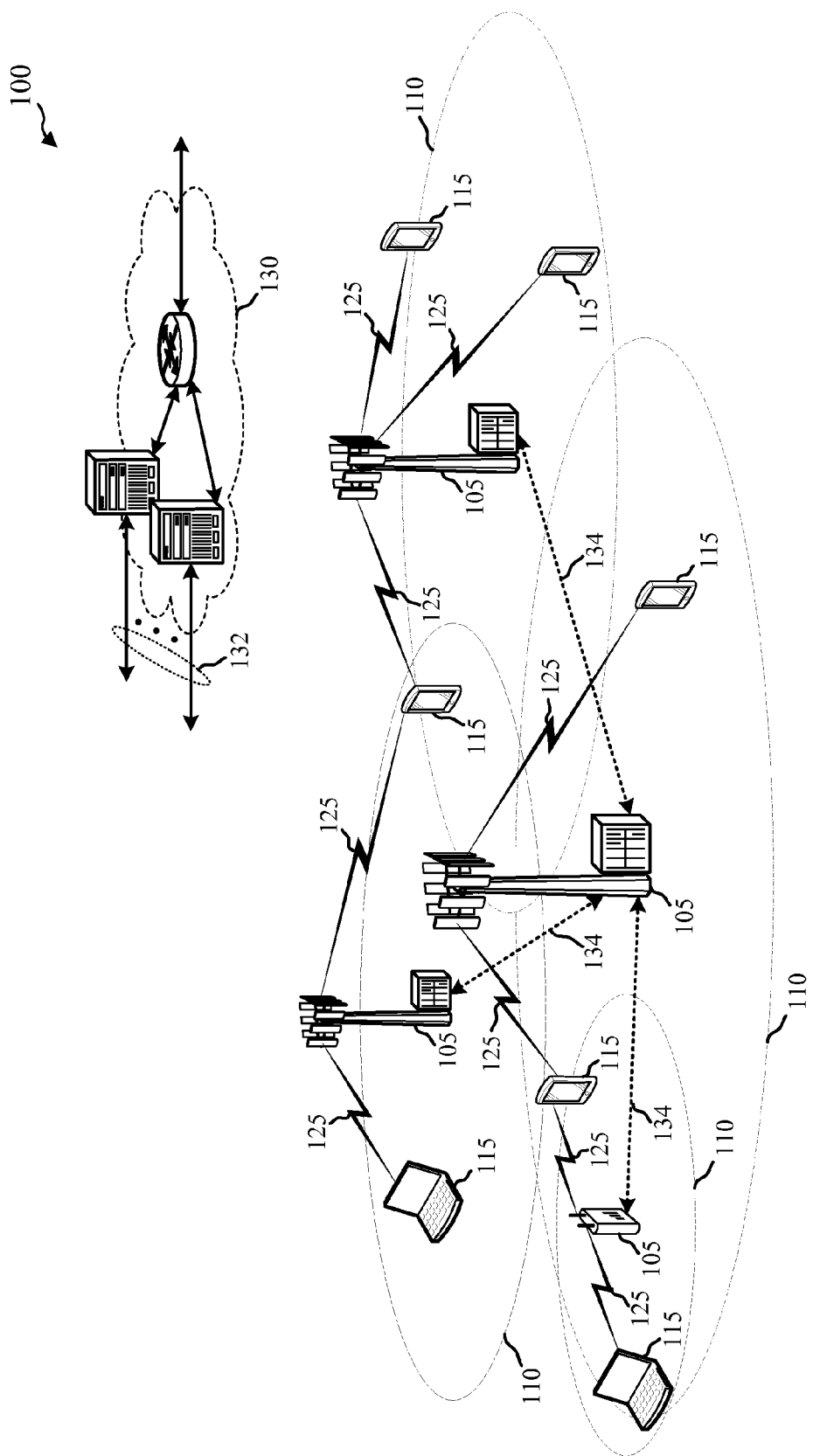
FIG. 1 illustrates an example of a wireless communications system, in accordance with various aspects of the present disclosure.

FIG. 1 illustrates an example of a wireless communications system 100, in accordance with various aspects of the present disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhauls 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be used to describe the base stations 105, while the term UE may be used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc.

Each carrier may be provided over a licensed radio frequency spectrum band or an unlicensed radio frequency spectrum band. Broadly speaking, the unlicensed spectrum in some jurisdictions may range from 600 Megahertz (MHz) to 6 Gigahertz (GHz). As used herein, the terms "unlicensed radio frequency spectrum," "unlicensed spectrum," or "shared spectrum" may thus refer to industrial, scientific and medical (ISM) radio bands, irrespective of the frequency of those bands. In some examples, unlicensed spectrum is the U-NII radio band, which may also be referred to as the 5 GHz or 5G band. By contrast, the terms "licensed radio frequency spectrum," "licensed spectrum," or "cellular spectrum" may be used herein to refer to wireless spectrum utilized by wireless network operators under administrative license from a governing agency. A set of carriers used in a mode of communication may all be received (e.g., at a UE 115) over the licensed radio frequency spectrum band, all be received (e.g., at a UE 115) over the unlicensed radio frequency spectrum band, or be received (e.g., at a UE 115) over a combination of the licensed radio frequency spectrum band and the unlicensed radio frequency spectrum band.

The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. The DL transmissions and/or UL transmissions may be made using the licensed radio frequency spectrum band, the unlicensed radio frequency spectrum band, or both.

In some examples of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for multi-carrier operation. Multi-carrier operation may be with both FDD and TDD component carriers. The component carriers may utilize the licensed radio frequency spectrum band, the unlicensed radio frequency spectrum band, or a combination of the licensed and unlicensed radio frequency spectrum bands.

In some examples of the wireless communications system 100, the unlicensed radio frequency spectrum band may be deployed under different scenarios. The deployment scenarios may include a supplemental downlink (SDL) mode in which downlink communications in the licensed radio frequency spectrum band may be offloaded to the unlicensed radio frequency spectrum band, a carrier aggregation (CA) mode in which both downlink and uplink communications may be offloaded from the licensed radio frequency spectrum band to the unlicensed radio frequency spectrum band, and/or a standalone (SA) mode in which downlink and uplink communications between a base station 105 and a UE 115 may take place in the unlicensed radio frequency spectrum band. Base stations 105, as well as UEs 115, may in some examples support one or more of these or similar modes of operation.

With increasing data traffic in cellular networks that use a licensed radio frequency spectrum band, offloading of at least some data traffic to an unlicensed radio frequency spectrum band may provide a cellular operator (e.g., an operator of a public land mobile network (PLMN) and/or a coordinated set of base stations defining a cellular network, such as an LTE/LTE-A network) with opportunities for enhanced data transmission capacity. Prior to gaining access to, and communicating over, the unlicensed radio frequency spectrum band, a transmitting apparatus may, in some examples, perform an LBT procedure to gain access to the unlicensed radio frequency spectrum band. Such an LBT procedure may include performing a clear channel assessment (CCA) procedure to determine whether a channel of the unlicensed radio frequency spectrum band is available. In some examples, an extended CCA (eCCA) procedure comprising a plurality of N CCA procedures may be performed. When it is determined that a channel is available, the transmitting apparatus may communicate over a carrier that includes the available channel. The transmitting apparatus may also broadcast a channel usage beacon signal (CUBS). The CUBS may indicate the usage of the available channel to other UEs 115 and/or base stations 105. The CUBS may indicate the usage of an available channel for uplink communications (U-CUBS) or for downlink communications (D-CUBS).

A transmission opportunity may include a radio frame, a subset of a radio frame, or any combination thereof. Similarly, a radio frame may be used, herein, to represent a transmission opportunity. A TDD radio frame may include downlink subframes, uplink subframes, a first special subframe S, and a second special subframe S'. The downlink subframes may include downlink communications. The uplink subframes may include uplink communications. The special subframes (S and S') may include a control and/or signaling communications. For example, the first special subframe S may carry D-CUBS, and the second special subframe S' may carry U-CUBS. The special subframes (S and S') may also include uplink or downlink communications in addition to the control and/or signaling communications. For example, the first special subframe S may include uplink communications, and the second special subframe S' may include downlink communications.

A UE 115 may receive a frame format indicator from a base station 105. The frame format indicator may include a TDD configuration indicator that indicates to the UE 115 the format of downlink subframes, uplink subframes, and special subframes that may be applicable for a current radio frame. The TDD configuration indicator may change each radio frame. A number of TDD configuration indicators available for the current radio frame may be based at least in part on when a CCA procedure is completed. If the CCA procedure is completed later in time in the radio frame, a fewer number of TDD configuration indicators may be available for the radio frame.

FIG. 2 shows a table 200 illustrating examples of TDD configurations 215-a through 215-h that may be applicable for a radio frame, in accordance with various aspects of the present disclosure. Each of the TDD configurations 215-a through 215-h may be represented by a four bit code 210. The four bit code 210 may be based on a three bit word to indicate a number 0 to 7, plus an additional bit for parity. The numbers 0 to 7 may correspond to each of the TDD configurations 215-a through 215-h. The TDD configurations 215-a through 215-h may indicate which subframes 205-a through 205-j of the radio frame may be configured as downlink subframes (illustrated as "D" in table 200), uplink subframes (illustrated as "U" in table 200), or special subframes (illustrated as "S" and "S'" in table 200). The additional bit for parity may be based on parity checks of the three bit word. If a0, a1 and a2 are the three bits of the three bit word, then the parity checks may include xor(a0,a1), xor(a0,a2), xor(a1,a2) and xor(a0,a1,a2). At times, the radio frame may represent a transmission opportunity.

For example, TDD configuration 215-c may correspond to a four bit code 210 having bits "0101". Subframes 205-a through 205-c of TDD configuration 215-c may be downlink subframes "D"; subframe 205-d may be a special subframe "S"; subframes 205-e through 205-i may be uplink subframes "U"; and subframe 205-j may be a special subframe "S'". The special subframe S may be configured prior to an uplink subframe U. The special subframe S may include a U-CUBS, and may also include additional downlink communications. The special subframe S' may be configured prior to a new radio frame. The special subframe S' may include a D-CUBS, and may also include additional uplink communications. Each of the TDD configurations 215-a through 215-h may include at least one downlink subframe D and a special subframe S'. The TDD configurations 215-a through 215-h may follow a canonical pattern of S'D[D . . . D]SU[U . . . U].

In some examples, the frame format indicator may support a supplemental downlink (SDL) configuration 215-h in a carrier aggregation mode having no uplink subframes U. The SDL configuration 215-h may include eight downlink subframes D and one special subframe S'.

A number of available TDD configurations may be based at least in part on an eCCA procedure performed by a base station. A number of available TDD configurations may be further based at least in part on the time it takes a UE to detect and decode a D-CUBS before a first downlink subframe, and by the time it takes the UE to decode the channel prior to a first uplink subframe.

A number of available TDD configurations for the frame format indicator may be based at least in part on when a base station completes the eCCA procedure. In some examples, the available TDD configuration may configure an uplink subframe at least four subframes after the eCCA procedure is completed. For example, if the base station completes the eCCA procedure during subframe 5, then the frame format indicator may indicate a TDD configuration (e.g., TDD configuration 6 215-g) with an uplink subframe four subframes after subframe 5. If an uplink subframe is configured earlier, the UE may not have sufficient time to configure data for the uplink subframe. Thus, one TDD configuration (e.g., TDD configuration 6 215-g) may be signaled to the UE. As another example, if the base station completes the eCCA procedure during subframe 4, then the frame format indicator may indicate TDD configurations 5 or 6 (215-f or 215-g). If the base station completes the eCCA procedure during subframe 3, then the frame format indicator may indicate TDD configurations 4, 5, or 6 (215-e, 215-f, or 215-g). If the base station completes the eCCA procedure during subframe 2, then the frame format indicator may indicate one of TDD configurations 3 through 6 (215-d through 215-g). If the base station completes the eCCA procedure during subframe 1, then the frame format indicator may indicate one of TDD configurations 2 through 6 (215-c through 215-g). If the base station completes the eCCA procedure during subframe 0, then the frame format indicator may indicate one of TDD configurations 1 through 6 (215-b through 215-g). Any of the TDD configurations 0 through 6 (215-a through 215-h) may be indicated by the frame format indicator if the eCCA procedure is completed during subframe 9 of the previous radio frame. The SDL configuration 215-h may be independent of the eCCA procedure of the base station.

In some examples, the frame format indicator may be transmitted by the base station during the current radio frame due to a change in the TDD configuration. The change of the TDD configuration during a radio frame may not be because of timing of when the eCCA procedure is completed, as described above.

In some examples, a UE may self-schedule an uplink transmission on an uplink secondary component carrier (U-SCC). With uplink self-scheduling, the UE may receive an uplink grant four or more subframes prior to the corresponding self-scheduled uplink subframe. With uplink self-scheduling, the available TDD configurations may be based at least in part on a gap time for the UE to respond to the uplink grant, and may also be based at least in part on the processing time at the UE for the uplink grant. The uplink grant for self-scheduled uplink may be for one uplink subframe U, or for multiple consecutive uplink subframes U of the current transmission opportunity or radio frame. The uplink grant may expire after the current radio frame in which the uplink grant was transmitted.

If the UE self-schedules an uplink transmission, then the available TDD configurations may be based at least in part on the additional time for the UE to self-schedule the uplink transmission. In some examples, a TDD configuration for a self-scheduling UE may configure an uplink subframe more than four subframes after the eCCA procedure of the base station is completed. If an uplink subframe is configured earlier, the self-scheduling UE may not have sufficient time to configure data for the uplink subframe. For example, if the base station completes the eCCA procedure during subframe 4, then the frame format indicator may indicate TDD configuration 6 (215-g). The UE may not have time to configure an uplink subframe if one of the other TDD configurations were indicated. As another example, if the base station completes the eCCA procedure during subframe 3, then the frame format indicator may indicate TDD configurations 5 or 6 (215-f or 215-g). If the base station completes the eCCA procedure during subframe 2, then the frame format indicator may indicate TDD configurations 4, 5, or 6 (215-e, 215-f, or 215-g). If the base station completes the eCCA procedure during subframe 1, then the frame format indicator may indicate one of TDD configurations 3 through 6 (215-d through 215-g). If the base station completes the eCCA procedure during subframe 0, then the frame format indicator may indicate one of TDD configurations 2 through 6 (215-c through 215-g). In some example, TDD configurations 0 and 1 (215-a and 215-b) may indicate that an uplink subframe should occur before a self-scheduling UE has time to configure data for the uplink subframe. Thus, TDD configurations 0 and 1 (215-a and 215-b) may be based at least in part on whether the UE is self-scheduling an uplink transmission.

In some examples, the UE may receive cross-carrier uplink grants from a primary component carrier (PCC) for a U-SCC. Each cross-carrier uplink grant may be for one uplink subframe U. The cross-carrier uplink grant may correspond to the uplink subframe U that is four subframes after the cross-carrier uplink grant is received. Therefore, the available TDD configurations with cross-carrier uplink grants may be the same as the available TDD configurations with a self-scheduled uplink. If the subframe that is four subframes after the cross-carrier uplink grant is not configured as an uplink subframe U, then the cross-carrier uplink grant may be invalid.

The base station, such as a base station 105 of FIG. 1, may transmit the frame format indicator to the UE. The frame format indicator may also be referred to as a physical frame format indicator, a physical frame format indicator channel, a TDD format indicator channel, an enhanced TDD format indicator channel, etc. The frame format indicator may include a codeword that indicates which of the TDD configurations 215-a through 215-h may be applicable for a radio frame, or transmission opportunity. The codeword may be a repetition of a code 210 corresponding to the applicable TDD configuration. For example, a codeword for TDD configuration 215-e with four repetitions of the corresponding code 210 may be "1001100110011001". In some examples, the codeword may include 12 repetitions of the corresponding code 210. In some examples, the codeword may be cyclically extended to adjust the length of a bit stream that includes the frame format indicator. Adjusting the length of the bit stream that includes the frame format indicator may allow the bit stream to match a rate of other bit streams.

In some cases, the code 210, or the codeword, may be based on a different encoding or decoding scheme. For example, a six bit Reed Muller code may be used. Specifically, a (32,O) coding scheme may be implemented, where the output is at least 32 bits and O is the number of encoding or input bits. In some cases, O may be 11 or less. The code 210, or codeword, may be repeated a number of times. In some cases, the code 210, or codeword, may be coded similar to a physical uplink control channel (PUCCH) for uplink transmission. It should be noted that the code 210, or codeword, may be encoded or decoded using any coding scheme known in the art.

In some examples, the code may indicate a number of downlink subframes D that occur prior to a special subframe S for the current transmission opportunity. The UE may then configure all subframes of the current transmission opportunity that come after the special subframe S as uplink subframes U until the last subframe (e.g., until subframe 9). The last subframe (e.g., subframe 9) may be configured as a special subframe S' in order to perform LBT procedure to gain access to a channel of an unlicensed radio frequency spectrum band. For example, a code of "000" may indicate one downlink subframe D before the special subframe S. A code of "001" may indicate two downlink subframes D before the special subframe S. A code of "110" may indicate seven downlink subframes D before the special subframe S. And a code of "110" may indicate a SDL configuration having eight downlink subframes D and no special subframe S. In some examples, a parity bit may be added to the codes to produce a four bit code.

The codewords may be non-linear. The distance between any two codewords may be greater than or equal to 2*N, where N is the number of repetition of a code 210 used for each codeword. The minimum distance between any codewords may be at least two. As an example, if N=8 repetitions, then the distance between any two codewords may be 16. If N=12 repetitions, then the distance between any two codewords may be 24. The repetition of a code 210 may generate a bit sequence of a codeword. For N=12 repetitions, the bit sequence may be denoted as b(0), b(1), . . . , b(47).

A base station, such as base station 105 of FIG. 1, may scramble the block of bits b(0), b(1), . . . , b(47) with a cell-specific sequence, resulting in a block of scrambled bits according to b'(i)=(b(i)+c(0))mod 2, where c(i) corresponds to the cell-specific sequence. The sequence generator for the cell-specific sequence may be initialized an initialization code. The block of bits b(0), b(1), . . . , b(47) may also be scrambled based on the PLMN ID.

The block of scrambled bits b'(0), b'(1), . . . , b'(47) may be modulated using a quadrature phase shift keying (QPSK) modulation, resulting in a block of complex valued modulation symbols d(0), d(1), . . . , d(23). The modulated symbols may be mapped to two port space frequency block code (SFBC) symbols. The two ports may correspond to a first and second antenna port of the base station. The first and second antenna ports may also be used for CUBS transmissions. The output of SFBC encoding may be a block of vectors y(i)=[y$^{(0)}$(i), y$^{(1)}$(i)], i=0, 1, 2, 3, . . . , 23.

Figure 3A:
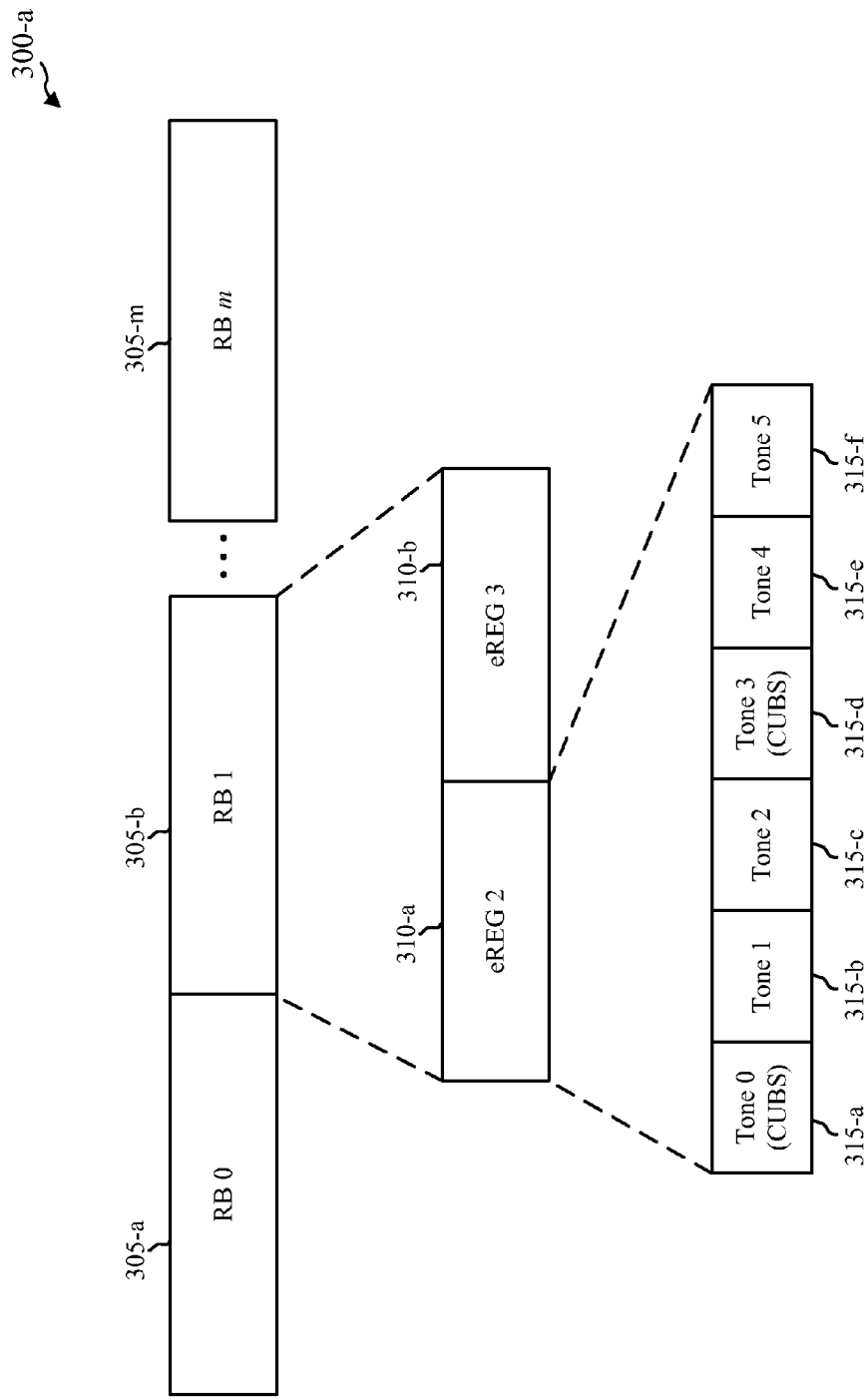
FIG. 3A shows an example of resource blocks of a channel of an unlicensed radio frequency spectrum band, in accordance with various aspects of the present disclosure.

FIG. 3A shows an example 300-a of resource blocks (RBs) 305-a through 305-m of a channel of an unlicensed radio frequency spectrum band, in accordance with various aspects of the present disclosure. In some examples, the channel may have a bandwidth of 20 MHz, and may include a number of RBs $N_{RB}$ (e.g., $N_{RB}$=100). Each RB 305-a through 305-m may include two enhanced resource element groups (eREGs). For example, RB 305-b may include eREG 2 310-a and eREG 3 310-b. The index of each eREG may be associated with the indices of the RBs. For example, the set of eREG indices associated with RB m may be 2m and 2m+1, where m=0, 1, 2, . . . , $N_{RB}$−1. Each eREG may be divided into six tones. For example eREG 2 310-a may be divided into tones 315-a through 315-f.

CUBS may occupy two of the six tones of an eREG. For example, tone 0 315-a and tone 3 315-d of eREG 2 310-a may be occupied by CUBS. A UE, such as UE 115 of FIG. 1, may expect to receive CUBS in a RB of the last OFDM symbol before a first DL subframe. CUBS may be used to estimate the channel condition (similar to a reference signal). The choice of which two tones are occupied by CUBS may be a function of a cell identification (ID) and/or a public land mobile network (PLMN) ID.

One or more of the remaining tones of an eREG occupied by CUBS may be available for the frame format indicator. For example, tone 1 315-b, tone 2 315-c, tone 4 315-e and/or tone 5 315-f of eREG 2 310-a may be available for the frame format indicator. A frame format indicator mapped to an eREG may have a same power boost value as the CUBS occupying the eREG, denoted by $\beta_{FFI}=\beta_{CUBS}$.

The modulated symbols mapped to the two port SFBC symbols ([y$^{(0)}$(i), y$^{(1)}$(i)]) may be multiplied by $\beta_{FFI}$ before being mapped to the eREG. Mapping to an eREG may be defined in terms of quadruplets of complex valued symbols, denoted as $z^p(i)=\beta_{FFI}\{y^p(4i), y^p(4i+1), y^p(4i+2), y^p(4i+3)\}$, i=0, 1, 2, 3, 4, 5, where the symbol quadruplet corresponds to antenna port p. The i$^{th}$ quadruplet mapped to an eREG may be represented $$k = \bar{k} + \text{floor}\left\{\frac{(i * N_{RB,FFI})}{3}\right\},$$

where $$\bar{k} = N^{PCI} \text{mod}\left\{\frac{N_{RB,FFI}}{3} = 32\right\}.$$

Figure 3B:
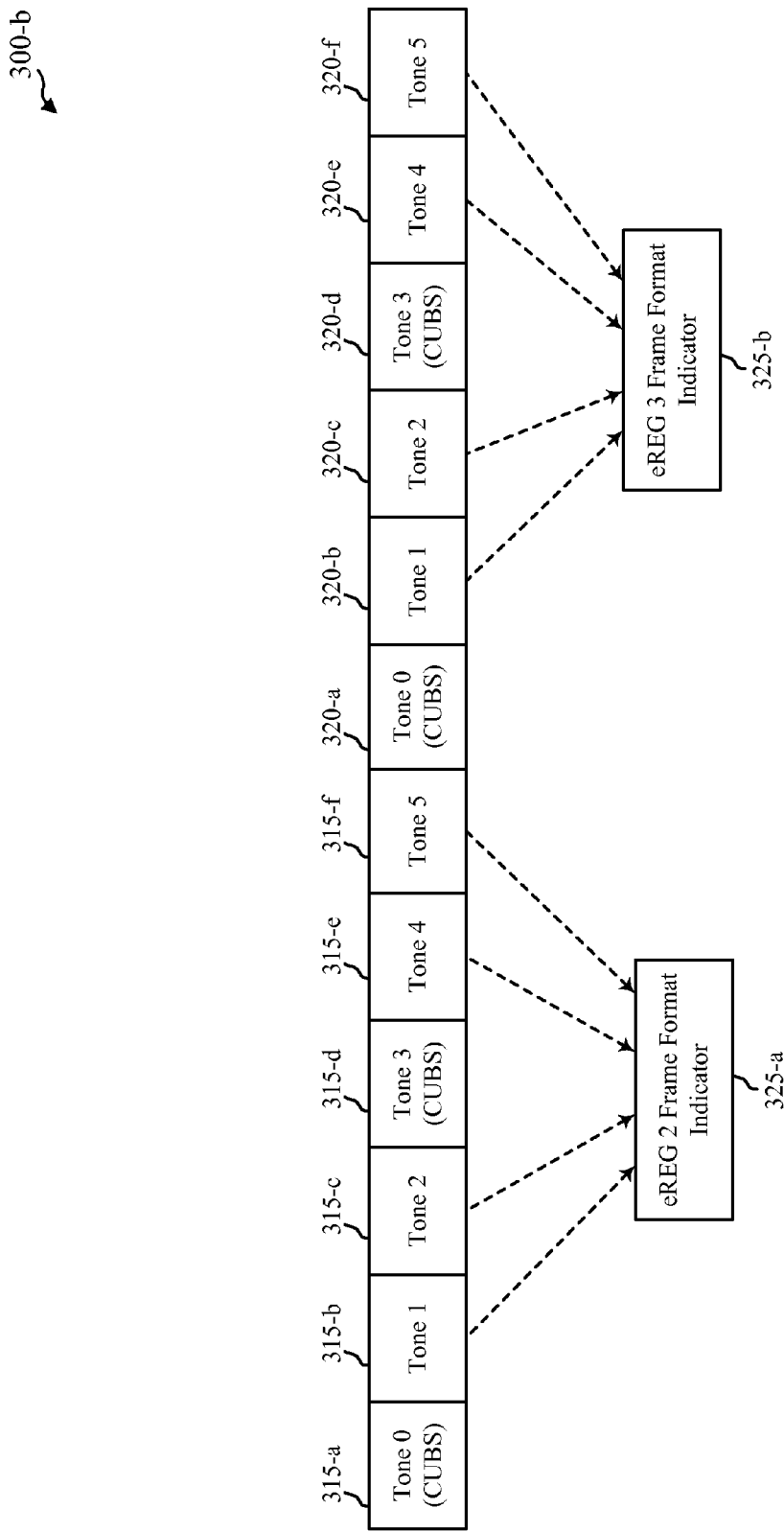
FIG. 3B shows an example of tones for carrying a frame format indicator, in accordance with various aspects of the present disclosure.

FIG. 3B shows an example 300-b of tones for carrying a frame format indicator, in accordance with various aspects of the present disclosure. Tones 315-a through 315-f may be tones of eREG 2 (as shown in FIG. 3A). Tones 320-a through 320-f may be tones of eREG 3 (as shown in FIG. 3A). CUBS may occupy two of the six tones of an eREG. For example, tone 0 315-a and tone 3 315-d of eREG 2, and tone 0 320-a and tone 3 320-d of eREG 3 may be occupied by CUBS. The remaining tones of an eREG carrying CUBS may carry a frame format indicator. For example, an eREG 2 frame format indicator 325-a may be carried by tone 1 315-b, tone 2 315-c, tone 4 315-e, and/or tone 5 315-f of eREG 2. An eREG 3 frame format indicator 325-b may be carried by tone 1 320-b, tone 2 320-c, tone 4 320-e, and/or tone 5 320-f of eREG 3.

Figure 4:
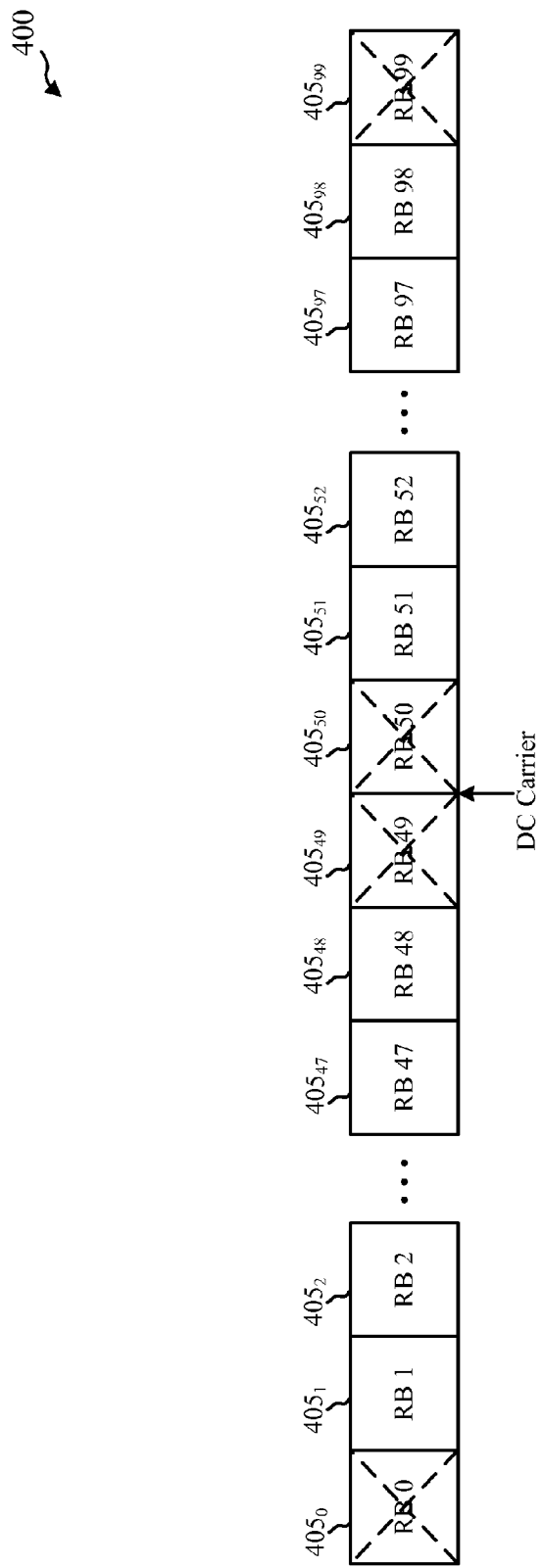
FIG. 4 shows another example of resource blocks of a channel of an unlicensed radio frequency spectrum band, in accordance with various aspects of the present disclosure.

FIG. 4 shows another example 400 of resource blocks (RBs) 405$_0$ through 405$_{99}$ of a channel of an unlicensed radio frequency spectrum band, in accordance with various aspects of the present disclosure. In some examples, the channel may have a bandwidth of 20 MHz (e.g., $N_{RB}$=100). In some examples, a subset ($N_{RB,FFI}$) of the 100 RBs 405$_0$ through 405$_{99}$ may be available for the frame format indicator. For example, 96 RBs may be available for the frame format indicator, and four RBs may be omitted ($N_{RB,FFI}$=96). The availability of 96 RBs for the frame format indicator may simplify mapping of the frame format indicator to the RBs, and may also improve decoding performance (e.g., due to 96 being a multiple of six).

Additional frame format indicators from other base stations (e.g., base stations 105 of FIG. 1) may be multiplexed in one or more of the 96 RBs.

The RBs that may be omitted from availability for the frame format indicator may include RB 0 405$_0$ and RB 99 405$_{99}$. RB 0 405$_0$ and RB 99 405$_{99}$ may be at the edge of the spectrum of the channel, and may experience degraded channel estimates. RB 49 405$_{49}$ and RB 50 405$_{50}$ may also be omitted from availability for the frame format indicator. RB 49 405$_{49}$ and RB 50 405$_{50}$ may be adjacent to the direct current (DC) carrier frequency, which may impact channel interpolation for those RBs. The eREGs of the remaining RBs available for the frame format indicator may be indexed as $\{0, 1, 2, 3, \ldots, 2N_{RB,FFI}-1\}$. For example, if $N_{RB,FFI}=96$, then the set of eREGs available for the frame format indicator may have indices $\{0, 1, 2, 3, \ldots, 191\}$.

Figure 5A:
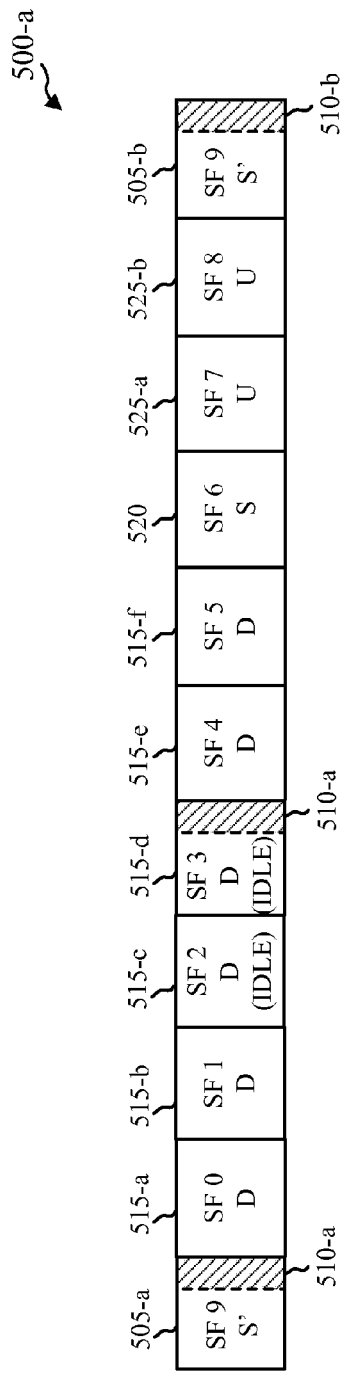
FIG. 5A shows an example of a radio frame, in accordance with various aspects of the present disclosure.

FIG. 5A shows an example 500-*a* of a radio frame, in accordance with various aspects of the present disclosure. The radio frame may represent a transmission opportunity. The radio frame may include subframe 0 through subframe 9. In some examples, subframe 9 of the previous radio frame may be a first downlink special subframe 505-*a*. The first downlink special subframe 505-*a* may include a D-CUBS. The first downlink special subframe 505-*a* may also include a first frame format indicator 510-*a*. In some examples, the frame format indicator may be transmitted in every OFDM symbol that carries D-CUBS. OFDM symbols in which fractional D-CUBS are transmitted may not include a frame format indicator. The first frame format indicator 510-*a* may indicate the TDD configuration for the current radio frame before the beginning of subframe 0. For example, the first frame format indicator 510-*a* may indicate a TDD configuration including six downlink subframes 515-*a* through 515-*f*, and two uplink subframes 525-*a* and 525-*b* (i.e., TDD configuration 5 of FIG. 2). An uplink special subframe 520 may be configured prior to the uplink subframes 525-*a* and 525-*b*. The uplink special subframe 520 may include a U-CUBS, and also may include additional downlink communications. After the uplink subframes 525-*a* and 525-*b*, a second downlink special subframe 505-*b* may be configured for subframe 9 of the current radio frame. The second downlink subframe 505-*b* may include a second frame format indicator 510-*b*, and may also include additional uplink communications. The second frame format indicator may indicate a TDD configuration for the next radio frame.

In some examples, a frame format indicator may be present in the last OFDM symbol of a subframe before the start of a downlink subframe. For example, if subframes 2 and 3 (515-*c* and 515-*d*) are idle following downlink communications in subframes 0 and 1 (515-*a* and 515-*b*), then the first frame format indicator 510-*a* may be present in subframe 3 (515-*d*) before the downlink communication resumes in subframe 4 (515-*e*). The first frame format indicator 510-*a* in subframe 3 (515-*d*) may indicate the same TDD configuration as the first frame format indicator 510-*a* in subframe 9 (505-*a*) of the previous radio frame.

In some cases, a frame format indicator may indicate a TDD configuration for a subframe, a partial subframe, or a blank subframe. Similarly, the frame format indicator may indicate a TDD configuration for a transmission opportunity, such as any combination of a radio frame, a subframe, a blank subframe, and a partial subframe, such as simultaneously. The frame format indicator may indicate a TDD configuration for additional subframes, blank subframes, or partial subframes through additional bits appended to the frame format indicator. In some cases, a frame format indicator indicating a TDD configuration for multiple radio frames, subframes, blank subframes, or partial subframes may include additional bits as a part of the frame format indicator before encoding the frame format indicator. In some examples, a radio frame may have a partial subframe before or a partial subframe after the radio frame, such as for scheduling or formatting, which may enable the radio frame to be used for uplink and downlink transmissions, such as data. In some cases, blank subframes may be used, such as for timing purposes. For example, if two carriers are close in frequency but have different amounts of data to transmit on the downlink, blank subframes may be added or appended to the carrier with less data so uplink may start at the same time for both carriers, such as if the carriers are close enough in frequency that they cannot be used for uplink and downlink simultaneously.

The frame format indicator may indicate a TDD configuration based on the size or length of subframes. For example, a frame format indicator indicating a TDD configuration for partial subframes may be used for small frame formats, such as 1 ms or 3 ms. In some cases, partial subframes may be used for small frame formats, until a threshold, such as 5 ms or 6 ms, after which full subframes may be used. In some examples, if the frame format exceeds the threshold, partial subframes may not be used.

In some examples, the UE may determine that a frame format indicator 510 received during a current radio frame is invalid. The UE may determine that the frame format indicator 510 is invalid if the frame format indicator 510 indicates a TDD configuration that is not available as of when the frame format indicator 510 is received. For example, if the frame format indicator 510 is received in subframe 3 (515-*d*), and indicates a TDD configuration having subframe 4 (515-*e*) as an uplink subframe, then the UE may determine frame format indicator 510 is invalid.

Figure 5B:
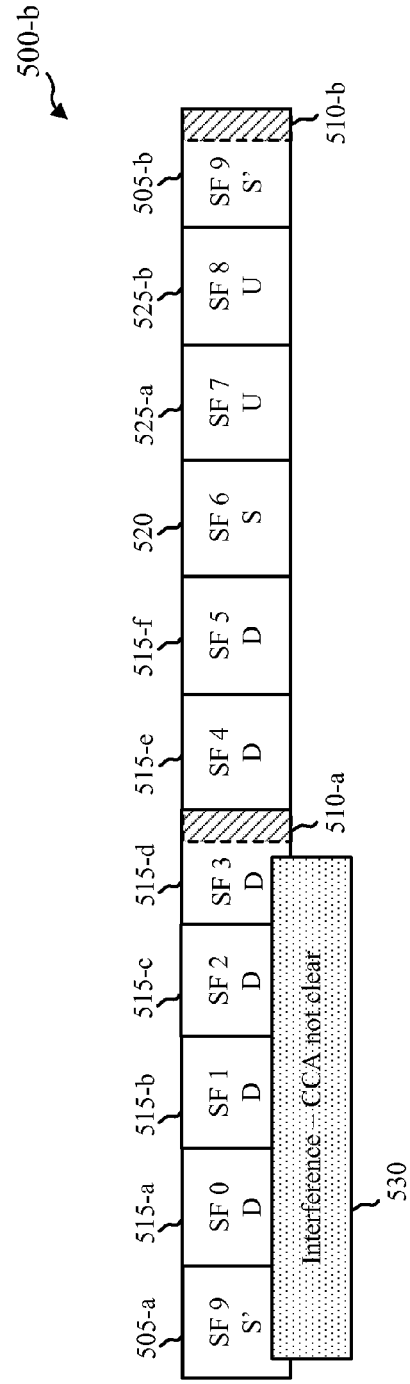
FIG. 5B shows another example of a radio frame, in accordance with various aspects of the present disclosure.

FIG. 5B shows another example 500-*b* of a radio frame, in accordance with various aspects of the present disclosure. The radio frame may represent a transmission opportunity. The radio frame may include subframe 0 through subframe 9. The radio frame of FIG. 5B may have the same TDD configuration as the radio frame of FIG. 5A, however the first four downlink subframes 515-*a* through 515-*d* may not clear a CCA procedure due to interference 530. Therefore, the first frame format indicator 510-*a* may not be present until subframe 3 (515-*d*), when the interference 530 subsides and a clear CCA procedure is detected. While the first frame format indicator 510-*a* may be received in the middle of the current radio frame, the first frame format indicator 510-*a* may still indicate the TDD configuration for the current radio frame. For example, as in FIG. 5A, the first frame format indicator 510-*a* may indicate a TDD configuration including six downlink subframes 515-*a* through 515-*f*, and two uplink subframes 525-*a* and 525-*b* (i.e., TDD configuration 5 of FIG. 2). The first four downlink subframes 515-*a* through 515-*d* may be discounted, as they occurred prior to the detection of the clear CCA procedure. If a frame format indicator is received in the middle of a radio frame, a UE, such as UE 115 of FIG. 1, may assume that any subframes occurring prior to the frame format indicator were downlink subframes that did not clear a CCA procedure. The remaining subframes 4 through 9 of FIG. 5B may be configured the same as subframes 4 through 9 of FIG. 5A. An uplink special subframe 520 may be configured prior to the uplink subframes 525-*a* and 525-*b*. The uplink special subframe 520 may include a U-CUBS, and also may include additional downlink communications. After the uplink subframes 525-*a* and 525-*b*, a second downlink special subframe 505-*b* may be configured for subframe 9 of the current radio frame.

The second downlink subframe 505-*b* may include a second frame format indicator 510-*b*, and may also include additional uplink communications. The second frame format indicator may indicate a TDD configuration for the next radio frame.

Figure 6:
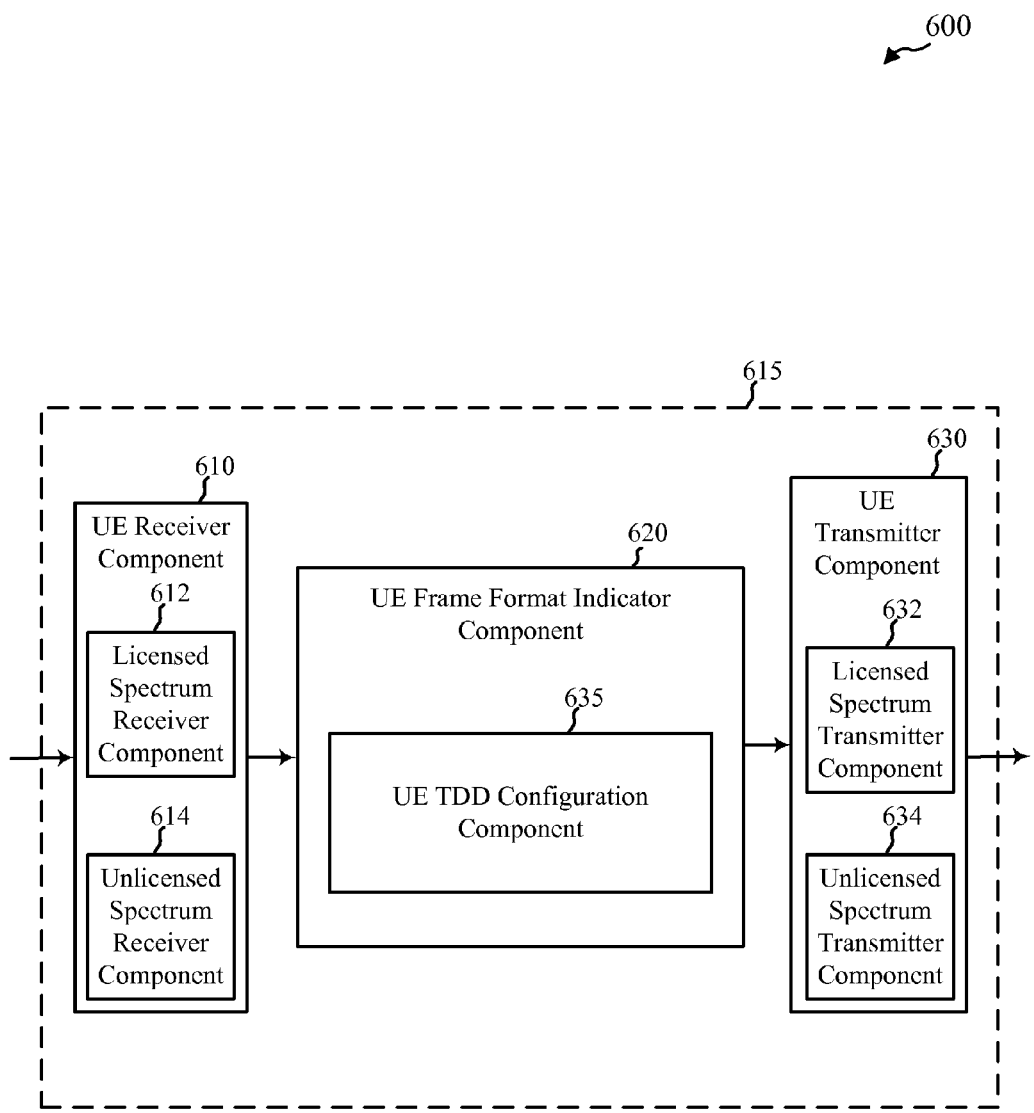
FIG. 6 shows a block diagram of a UE for use in wireless communication, in accordance with various aspects of the present disclosure.

FIG. 6 shows a block diagram 600 of a UE 615 for use in wireless communication, in accordance with various aspects of the present disclosure. In some examples, the UE 615 may be an example of aspects of the UE 115 described with reference to FIG. 1. The UE 615 may also be a processor. The UE 615 may include a UE receiver component 610, a UE frame format indicator component 620, and/or a UE transmitter component 630. Each of these components may be in communication with each other.

The components of the UE 615 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the UE receiver component 610 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to one or more users (e.g., LTE/LTE-A users) for some uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for communication of a radio frame and/or a frame format indicator, as described, for example, with reference to FIGS. 1-5. The UE receiver component 610 may in some cases include separate receivers for the licensed radio frequency spectrum band and the unlicensed radio frequency spectrum band. The separate receivers may, in some examples, take the form of a licensed RF spectrum band receiver component 612 for communicating over the licensed radio frequency spectrum band, and an unlicensed RF spectrum band receiver component 614 for communicating over the unlicensed radio frequency spectrum band. The UE receiver component 610 may also include receiver components for communicating over other radio frequency spectrum bands and/or for communicating via other radio access technologies (e.g., Wi-Fi). The UE receiver component 610, including the licensed RF spectrum band receiver component 612 and/or the unlicensed RF spectrum band receiver component 614 may be used to receive various types of data and/or control signals (i.e., transmissions) over one or more communication links of a wireless communication system, such as one or more communication links of the wireless communications system 100 described with reference to FIG. 1. The communication links may be established over the licensed radio frequency spectrum band and/or the unlicensed radio frequency spectrum band.

In some examples, the UE transmitter component 630 may include at least one RF transmitter, such as at least one RF transmitter operable to transmit over the licensed radio frequency spectrum band and/or the unlicensed radio frequency spectrum band. The UE transmitter component 630 may in some cases include separate transmitters for the licensed radio frequency spectrum band and the unlicensed radio frequency spectrum band. The separate transmitters may, in some examples, take the form of a licensed RF spectrum band transmitter component 632 for communicating over the licensed radio frequency spectrum band, and an unlicensed RF spectrum band transmitter component 634 for communicating over the unlicensed radio frequency spectrum band. The UE transmitter component 630, including the licensed RF spectrum band transmitter component 632 and/or the unlicensed RF spectrum band transmitter component 634 may be used to transmit various types of data and/or control signals (i.e., transmissions) over one or more communication links of a wireless communication system, such as one or more communication links of the wireless communications system 100 described with reference to FIG. 1. The communication links may be established over the licensed radio frequency spectrum band and/or the unlicensed radio frequency spectrum band.

In some examples, the UE frame format indicator component 620 may receive a frame format indicator from a base station. The UE frame format indicator component 620 may receive the frame format indicator in an eREG of a RB from the base station. The RB containing the eREG may be located between an edge of a system bandwidth and a direct current (DC) carrier of the system bandwidth. The frame format indicator may be received in an OFDM symbol corresponding to the eREG. The OFDM symbol may be received before a downlink subframe of the current radio frame. The ODFM symbol may also carry a CUBS. The UE frame format indicator component 620 may decode the received frame format indicator before an end of a first downlink subframe of the current radio frame. Decoding the frame format indicator may include demodulating and descrambling the frame format indicator to obtain a codeword. The codeword may be associated with a TDD configuration.

In some examples, the UE frame format indicator component 620 may include a UE TDD configuration component 635. The UE TDD configuration component 635 may determine a TDD configuration for the current subframe based on the codeword. The codeword may include repetitions of a code, and the code may indicate the TDD configuration to the UE TDD configuration component 635. In some examples, the code may indicate a number of downlink subframes between two special subframes. The UE TDD configuration component 635 may determine the TDD configuration for the current subframe based on the number.

In some examples, the UE frame format indicator component 620 may receive a second frame format indicator during a subframe of the current radio frame. The UE TDD configuration component 635 may invalidate the second frame format indicator based at least in part on which subframe the second frame format indicator is received.

In some examples, the UE TDD configuration component 635 may determine the TDD configuration includes at least one uplink subframe corresponding to a cross-carrier grant from a primary cell. The UE TDD configuration component 635 may configure the uplink subframe if the cross-carrier grant occurred at least four subframes before the scheduled uplink subframe. In some examples, the UE TDD configuration component 635 may determine the TDD configuration includes at least one uplink subframe corresponding to a self-scheduled uplink grant. The UE TDD configuration component 635 may configure the uplink subframe if the self-scheduled uplink grant occurred more than four subframes before the self-scheduled uplink subframe.

Figure 7:
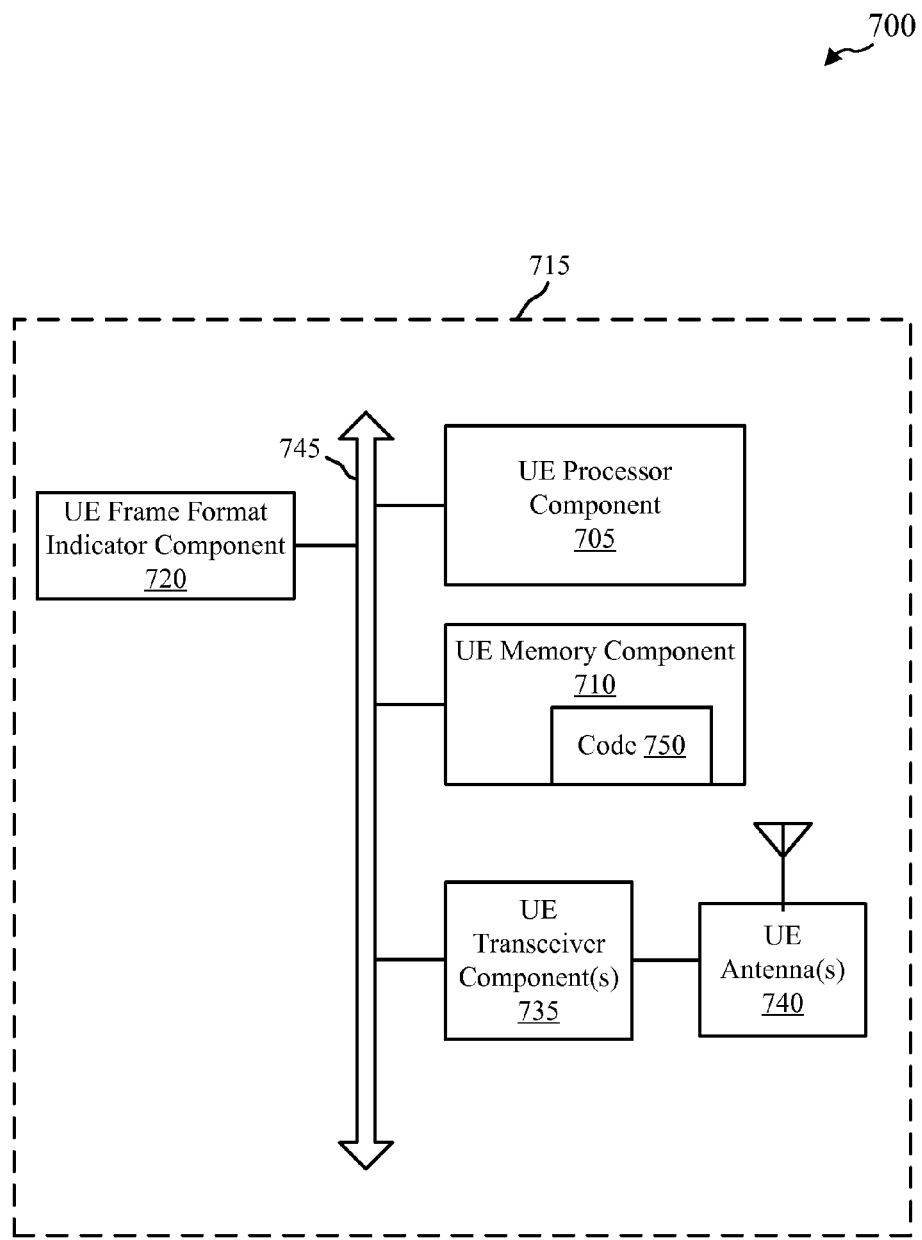
FIG. 7 shows a system for use in wireless communication, in accordance with various aspects of the present disclosure.

FIG. 7 shows a system 700 for use in wireless communication, in accordance with various aspects of the present disclosure. System 700 may include a UE 715, which may be an example of the UEs 115 of FIG. 1. UE 715 may also be an example of one or more aspects of UE 615 of FIG. 6.

The UE 715 may include components for bi-directional voice and data communications including components for transmitting communications and components for receiving communications. The UE 715 may include UE antenna(s) 740, UE transceiver component(s) 735, a UE processor component 705, and a UE memory component 710 (including software code 750), which each may communicate, directly or indirectly, with each other (e.g., via one or more buses 745). The UE transceiver component(s) 735 may be configured to communicate bi-directionally, via the UE antenna(s) 740 and/or one or more wired or wireless links, with one or more networks, as described above. For example, the UE transceiver component(s) 735 may be configured to communicate bi-directionally with base stations 105 with reference to FIG. 1. The UE transceiver component(s) 735 may include a modem configured to modulate the packets and provide the modulated packets to the UE antenna(s) 740 for transmission, and to demodulate packets received from the UE antenna(s) 740. While the UE 715 may include a single antenna 740, the UE 715 may have multiple antennas 740 capable of concurrently transmitting and/or receiving multiple wireless transmissions. The UE transceiver component 735 may be capable of concurrently communicating with one or more base stations 105 via multiple component carriers. The UE 715 may also include a UE frame format indicator component 720, which may perform the functions described above for the UE frame format indicator component 620 of UE 615 of FIG. 6.

The UE memory component 710 may include random access memory (RAM) and read-only memory (ROM). The UE memory component 710 may store computer-readable, computer-executable software/firmware code 750 containing instructions that are configured to, when executed, cause the UE processor component 705 to perform various functions described herein (e.g., determine a TDD configuration from a frame format indicator, etc.). Alternatively, the computer-readable, computer-executable software/firmware code 750 may not be directly executable by the UE processor component 705 but be configured to cause a computer (e.g., when compiled and executed) to perform functions described herein. The UE processor component 705 may include an intelligent hardware device, e.g., a central processing unit (CPU), a microcontroller, an application-specific integrated circuit (ASIC), etc.

Figure 8:
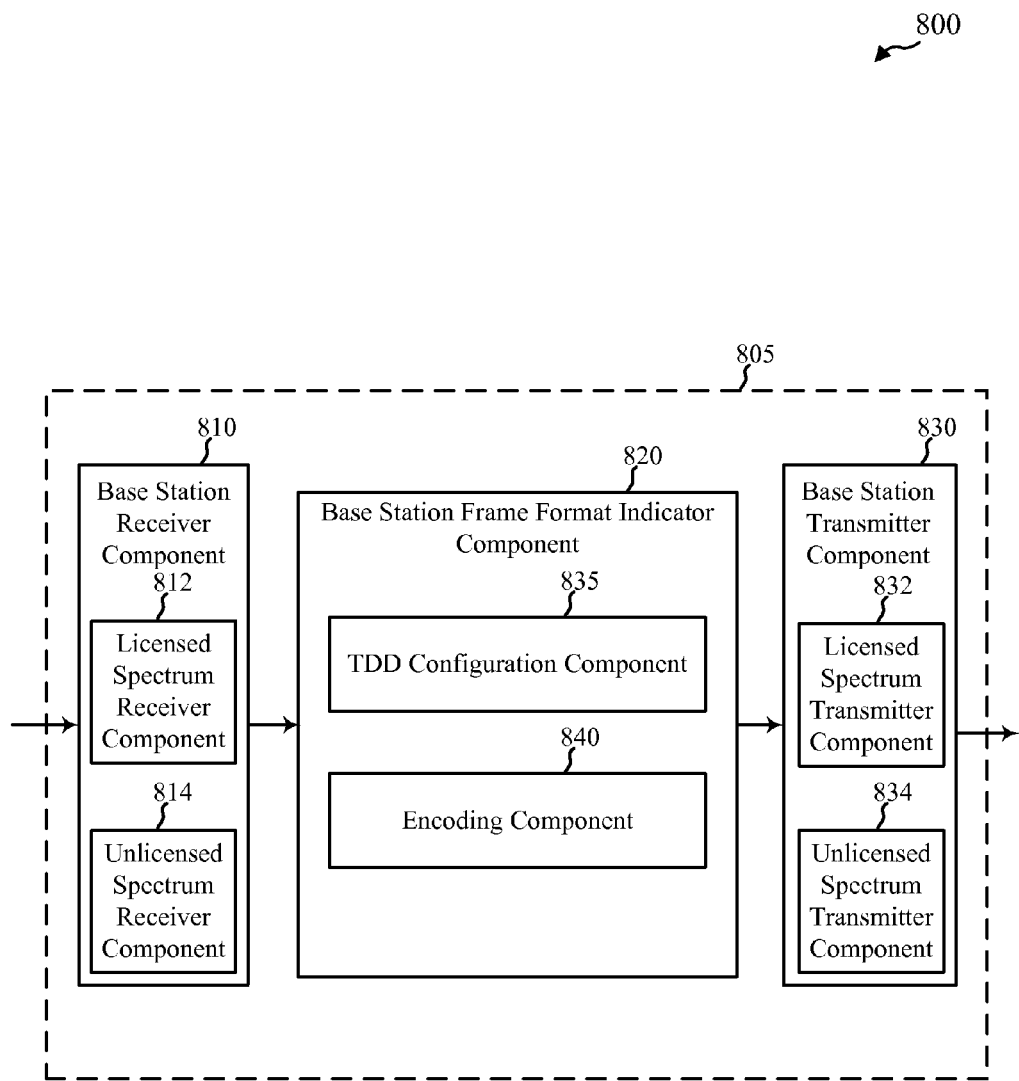
FIG. 8 shows a block diagram of a base station for use in wireless communication, in accordance with various aspects of the present disclosure.

FIG. 8 shows a block diagram 800 of a base station 805 for use in wireless communication, in accordance with various aspects of the present disclosure. In some examples, the base station 805 may be an example of aspects of the base station 105 described with reference to FIG. 1. The base station 805 may also be a processor. The base station 805 may include a base station receiver component 810, a base station frame format indicator component 820, and/or a base station transmitter component 830. Each of these components may be in communication with each other.

The components of the base station 805 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the base station receiver component 810 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to one ore more users (e.g., LTE/LTE-A users) for some uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for communication of a radio frame and/or a frame format indicator, as described, for example, with reference to FIGS. 1-5. The base station receiver component 810 may in some cases include separate receivers for the licensed radio frequency spectrum band and the unlicensed radio frequency spectrum band. The separate receivers may, in some examples, take the form of a licensed RF spectrum band receiver component 812 for communicating over the licensed radio frequency spectrum band, and an unlicensed RF spectrum band receiver component 814 for communicating over the unlicensed radio frequency spectrum band. The base station receiver component 810 may also include receiver components for communicating over other radio frequency spectrum bands and/or for communicating via other radio access technologies (e.g., Wi-Fi). The base station receiver component 810, including the licensed RF spectrum band receiver component 812 and/or the unlicensed RF spectrum band receiver component 814 may be used to receive various types of data and/or control signals (i.e., transmissions) over one or more communication links of a wireless communication system, such as one or more communication links of the wireless communications system 100 described with reference to FIG. 1. The communication links may be established over the licensed radio frequency spectrum band and/or the unlicensed radio frequency spectrum band.

In some examples, the base station transmitter component 830 may include at least one RF transmitter, such as at least one RF transmitter operable to transmit over the licensed radio frequency spectrum band and/or the unlicensed radio frequency spectrum band. The base station transmitter component 830 may in some cases include separate transmitters for the licensed radio frequency spectrum band and the unlicensed radio frequency spectrum band. The separate transmitters may, in some examples, take the form of a licensed RF spectrum band transmitter component 832 for communicating over the licensed radio frequency spectrum band, and an unlicensed RF spectrum band transmitter component 834 for communicating over the unlicensed radio frequency spectrum band. The base station transmitter component 830, including the licensed RF spectrum band transmitter component 832 and/or the unlicensed RF spectrum band transmitter component 834 may be used to transmit various types of data and/or control signals (i.e., transmissions) over one or more communication links of a wireless communication system, such as one or more communication links of the wireless communications system 100 described with reference to FIG. 1. The communication links may be established over the licensed radio frequency spectrum band and/or the unlicensed radio frequency spectrum band.

In some examples, the base station frame format indicator component 820 may transmit a frame format indicator to a UE. In some examples, the base station frame format indicator component 820 may also include a TDD configuration component 835 and an encoding component 840.

In some examples, the frame format indicator may include a codeword associated with a TDD configuration. The encoding component 840 may scramble the codeword with a sequence associated with the base station 805. Alternatively or in addition, the sequence may be associated with a public land mobile network (PLMN) identification. The encoding component 840 may then modulate the scrambled codeword with quadrature phase shift keying (QPSK). In some examples, the encoding component 840 may map the codeword to space frequency block code (SFBC) symbols associated with two antenna ports of the base station 805. In some examples, the two antenna ports may correspond to antenna ports for channel usage beacon signal (CUBS) transmissions. In some examples, the encoding component 840 may map the SFBC symbols to an enhanced resource element group (eREG) of a RB.

The RB configured with the frame format indicator may be located between an edge of a system bandwidth and a direct current (DC) carrier of the system bandwidth. In some examples, the encoding component 840 may multiplex the frame format indicator with a second frame format indicator from a second base station.

In some examples, the base station frame format indicator component 820 may transmit the frame format indicator in an orthogonal frequency division multiplexing (OFDM) symbol before a downlink subframe of the radio frame. In some examples, the OFDM symbol may also carry a channel usage beacon signal (CUBS).

In some examples, the TDD configuration component 835 may determine a TDD configuration for the current radio frame. The TDD configuration may include uplink subframes, downlink subframes, and special subframes. The TDD configuration component 835 may determine an available configuration of uplink subframes, downlink subframes, and special subframes. The TDD configuration component 835 may then determine a code to indicate the TDD configuration. In some examples, the code may indicate a number of downlink subframes between two special subframes. The TDD configuration component 835 may repeat the code to generate a codeword. The TDD configuration component 835 may then pass the codeword to the encoding component 840 to include in the frame format indicator.

In some examples, the TDD configuration component 835 may determine a TDD configuration that includes at least one uplink subframe corresponding to a cross-carrier grant from a primary cell. The base station frame format indicator component 820 may transmit the corresponding frame format indicator at least four subframes before the scheduled uplink subframe. In some examples, the TDD configuration component 835 may determine a TDD configuration that includes at least one uplink subframe corresponding to a UE self-scheduled uplink grant. The base station frame format indicator component 820 may transmit the corresponding frame format indicator more than four subframes before the self-scheduled uplink subframe.

Figure 9:
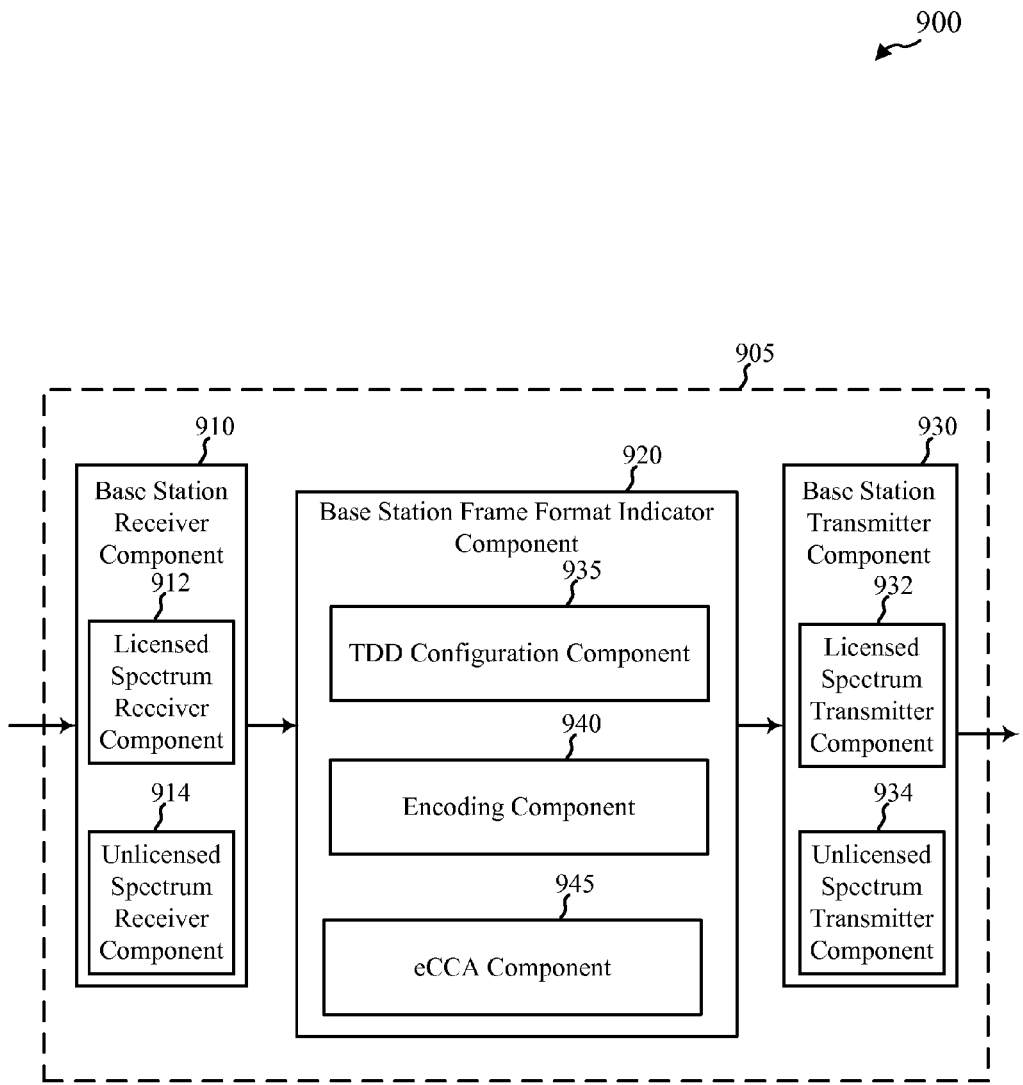
FIG. 9 shows a block diagram of a base station for use in wireless communication, in accordance with various aspects of the present disclosure.

FIG. 9 shows a block diagram 900 of a base station 905 for use in wireless communication, in accordance with various aspects of the present disclosure. In some examples, the base station 905 may be an example of aspects of the base station 105 described with reference to FIG. 1, and/or the base station 805 described with reference to FIG. 8. The base station 905 may also be a processor. The base station 905 may include a base station receiver component 910, a base station frame format indicator component 920, and/or a base station transmitter component 930. Each of these components may be in communication with each other.

The components of the base station 905 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the base station receiver component 910 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to one or more users (e.g., LTE/LTE-A users) for some uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for communication of a radio frame and/or a frame format indicator, as described, for example, with reference to FIGS. 1-5. The base station receiver component 910 may in some cases include separate receivers for the licensed radio frequency spectrum band and the unlicensed radio frequency spectrum band. The separate receivers may, in some examples, take the form of a licensed RF spectrum band receiver component 912 for communicating over the licensed radio frequency spectrum band, and an unlicensed RF spectrum band receiver component 914 for communicating over the unlicensed radio frequency spectrum band. The base station receiver component 910 may also include receiver components for communicating over other radio frequency spectrum bands and/or for communicating via other radio access technologies (e.g., Wi-Fi). The base station receiver component 910, including the licensed RF spectrum band receiver component 912 and/or the unlicensed RF spectrum band receiver component 914 may be used to receive various types of data and/or control signals (i.e., transmissions) over one or more communication links of a wireless communication system, such as one or more communication links of the wireless communications system 100 described with reference to FIG. 1. The communication links may be established over the licensed radio frequency spectrum band and/or the unlicensed radio frequency spectrum band.

In some examples, the base station transmitter component 930 may include at least one RF transmitter, such as at least one RF transmitter operable to transmit over the licensed radio frequency spectrum band and/or the unlicensed radio frequency spectrum band. The base station transmitter component 930 may in some cases include separate transmitters for the licensed radio frequency spectrum band and the unlicensed radio frequency spectrum band. The separate transmitters may, in some examples, take the form of a licensed RF spectrum band transmitter component 932 for communicating over the licensed radio frequency spectrum band, and an unlicensed RF spectrum band transmitter component 934 for communicating over the unlicensed radio frequency spectrum band. The base station transmitter component 930, including the licensed RF spectrum band transmitter component 932 and/or the unlicensed RF spectrum band transmitter component 934 may be used to transmit various types of data and/or control signals (i.e., transmissions) over one or more communication links of a wireless communication system, such as one or more communication links of the wireless communications system 100 described with reference to FIG. 1. The communication links may be established over the licensed radio frequency spectrum band and/or the unlicensed radio frequency spectrum band.

In some examples, the base station frame format indicator component 920 may be an example of one or more aspects of the base station frame format indicator component 820 described with reference to FIG. 8. The base station frame format indicator component 920 may include a TDD configuration component 935 and an encoding component 940. The TDD configuration component 935 and the encoding component 940 may be examples of one or more aspects of the TDD configuration component 835 and the encoding component 840 described with reference to FIG. 8.

In some examples, the base station frame format indicator component 920 may also include an eCCA component 945. The eCCA component 945 may perform an eCCA procedure to determine if a channel of an unlicensed radio frequency spectrum band is available for use as an uplink channel or as a downlink channel. Once the eCCA component 945 completes an eCCA procedure and determines a channel may is available for downlink, the eCCA component 945 may generate a D-CUBS. The TDD configuration component 935 may then determine an available TDD configuration based at least in part on when within the radio frame the eCCA procedure is completed. The determined available TDD configuration may include a first uplink subframe that is at least four subframes after the eCCA procedure is completed. In some examples, the encoding component 940 may configure an eREG carrying the D-CUBS to also carry the frame format indicator.

Figure 10:
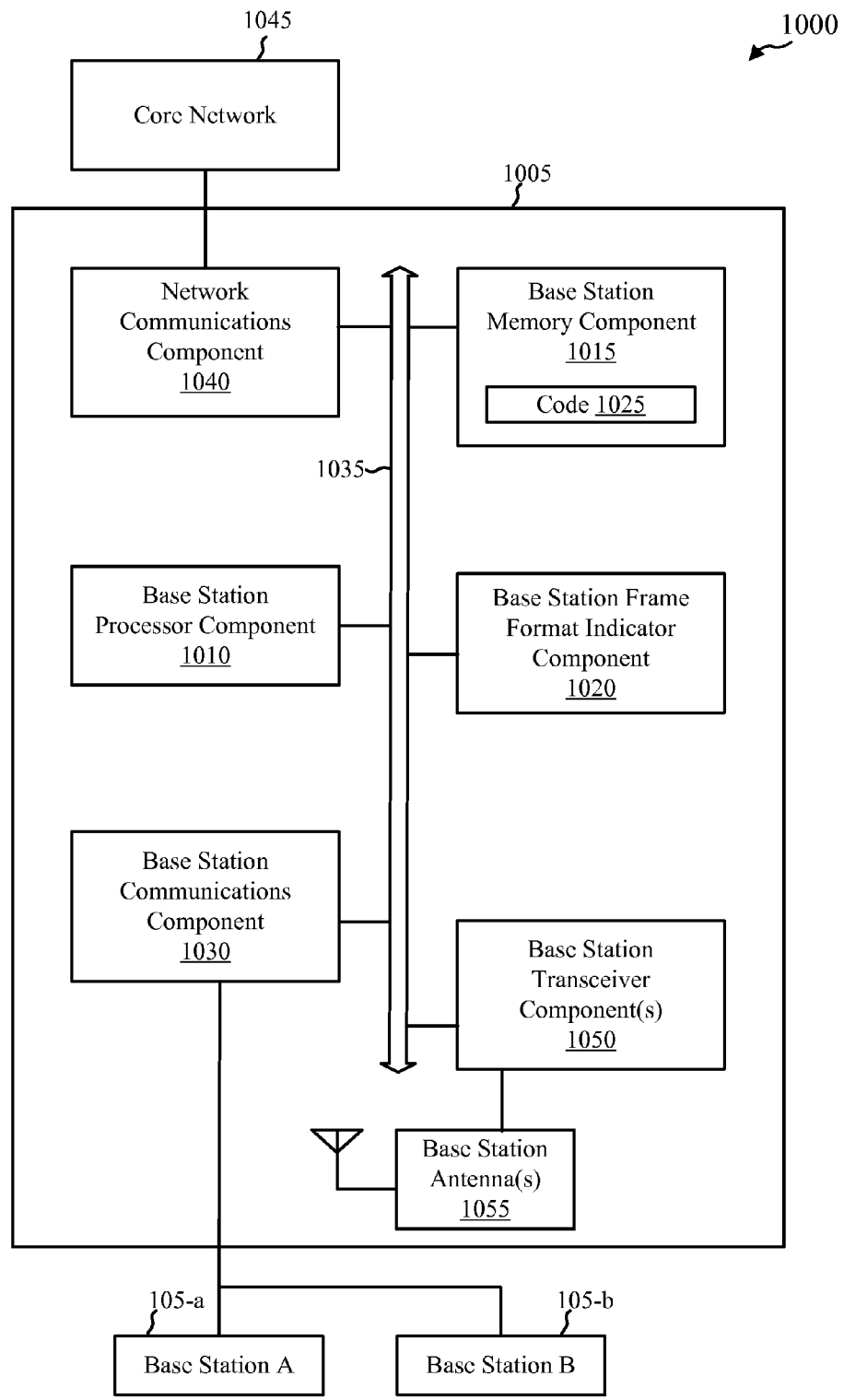
FIG. 10 shows a block diagram of a base station for use in wireless communication, in accordance with various aspects of the present disclosure.

FIG. 10 shows a block diagram 1000 of a base station 1005 (e.g., a base station forming part or all of an eNB) for use in wireless communication, in accordance with various aspects of the present disclosure. In some examples, the base station 1005 may be an example of aspects of one or more of the base stations 105 described with reference to FIG. 1, and/or aspects of one or more of the base stations 805 and/or 905, as described with reference to FIGS. 8 and/or 9. The base station 1005 may be configured to implement or facilitate at least some of the base station features and functions described with reference to FIGS. 1-9.

The base station 1005 may include a base station processor component 1010, a base station memory component 1015, at least one base station transceiver component (represented by base station transceiver component(s) 1050), at least one base station antenna (represented by base station antenna(s) 1055), and/or a base station frame format indicator component 1020. The base station 1005 may also include one or more of a base station communications component 1030 and/or a network communications component 1040. Each of these components may be in communication with each other, directly or indirectly, over one or more buses 1035.

The base station memory component 1015 may include random access memory (RAM) and/or read-only memory (ROM). The base station memory component 1015 may store computer-readable, computer-executable software/firmware code 1025 containing instructions that are configured to, when executed, cause the base station processor component 1010 to perform various functions described herein related to wireless communication (e.g., transmitting a frame format indicator corresponding to a TDD configuration, etc.). Alternatively, the computer-readable, computer-executable software/firmware code 1025 may not be directly executable by the base station processor component 1010 but be configured to cause the base station 1005 (e.g., when compiled and executed) to perform various of the functions described herein.

The base station processor component 1010 may include an intelligent hardware device, e.g., a central processing unit (CPU), a microcontroller, an ASIC, etc. The base station processor component 1010 may process information received through the base station transceiver component(s) 1050, the base station communications component 1030, and/or the network communications component 1040. The base station processor component 1010 may also process information to be sent to the transceiver component(s) 1050 for transmission through the antenna(s) 1055, to the base station communications component 1030, for transmission to one or more other base stations 105-*a* and 105-*b*, and/or to the network communications component 1040 for transmission to a core network 1045, which may be an example of one or more aspects of the core network 130 described with reference to FIG. 1. The base station processor component 1010 may handle, alone or in connection with the base station frame format indicator component 1020, various aspects of determining a TDD configuration and generating a frame format indicator.

The base station transceiver component(s) 1050 may include a modem configured to modulate packets and provide the modulated packets to the base station antenna(s) 1055 for transmission, and to demodulate packets received from the base station antenna(s) 1055. The base station transceiver component(s) 1050 may, in some examples, be implemented as one or more base station transmitter components and one or more separate base station receiver components. The base station transceiver component(s) 1050 may support communications in a licensed radio frequency spectrum band and an unlicensed radio frequency spectrum band. The base station transceiver component(s) 1050 may be configured to communicate bi-directionally, via the antenna(s) 1055, with one or more UEs or apparatuses, such as one or more of the UEs 115 described with reference to FIG. 1, and/or UEs 615 and/or 715 described with reference to FIGS. 6 and/or 7. The base station 1005 may, for example, include multiple base station antennas 1055 (e.g., an antenna array). The base station 1005 may communicate with the core network 1045 through the network communications component 1040. The base station 1005 may also communicate with other base stations, such as the base stations 105-a and 105-b, using the base station communications component 1030.

The base station frame format indicator component 1020 may be configured to perform and/or control some or all of the features and/or functions described with reference to FIGS. 1-9 related to generating and/or transmitting a frame format indicator. The base station frame format indicator component 1020, or portions of the base station frame format indicator component 1020, may include a processor, and/or some or all of the functions of the base station frame format indicator component 1020 may be performed by the base station processor component 1010 and/or in connection with the base station processor component 1010. In some examples, the base station frame format indicator component 1020 may be an example of the base station frame format indicator component 820 and/or 920 described with reference to FIGS. 8 and/or 9.

Figure 11:
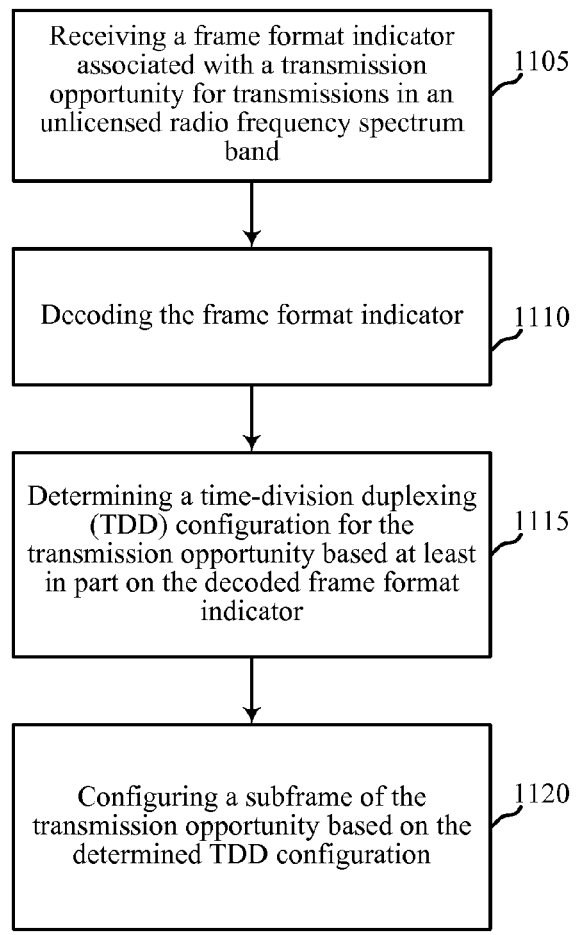
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the UEs described with reference to FIGS. 1-9. In some examples, a UE may execute one or more sets of codes to control the functional elements of the UE to perform the functions described below. Additionally or alternatively, the UE may perform one or more of the functions described below using special-purpose hardware.

At block 1105, the method 1100 may include receiving a frame format indicator associated with a transmission opportunity for transmissions in an unlicensed radio frequency spectrum band. In some examples, the frame format indicator may be received before a first subframe of the transmission opportunity. In other examples, the frame format indicator may be received during a middle portion of the transmission opportunity. At block 1110, the method 1100 may include decoding the frame format indicator. In some examples, the frame format indicator may be decoded before an end of a first downlink subframe of the transmission opportunity. In some examples, the frame format indicator may include a codeword associated with a TDD configuration, and decoding the frame format indicator may include decoding the codeword. At block 1115, the method 1100 may include determining a TDD configuration for the transmission opportunity based at least in part on the decoded frame format indicator. At block 1120, the method 1100 may include configuring a subframe of the transmission opportunity based on the determined TDD configuration. The subframe may be configured as an uplink subframe, a downlink subframe, a first special subframe S, or a second special subframe S'. The operations at blocks 1105, 1110, 1115, and 1120 may be performed using the UE frame format indicator component 620 and/or 720 described with reference to FIGS. 6 and 7.

Thus, the method 1100 may provide for wireless communication. It should be noted that the method 1100 is just one implementation and that the operations of the method 1100 may be rearranged or otherwise modified such that other implementations are possible.

Figure 12:
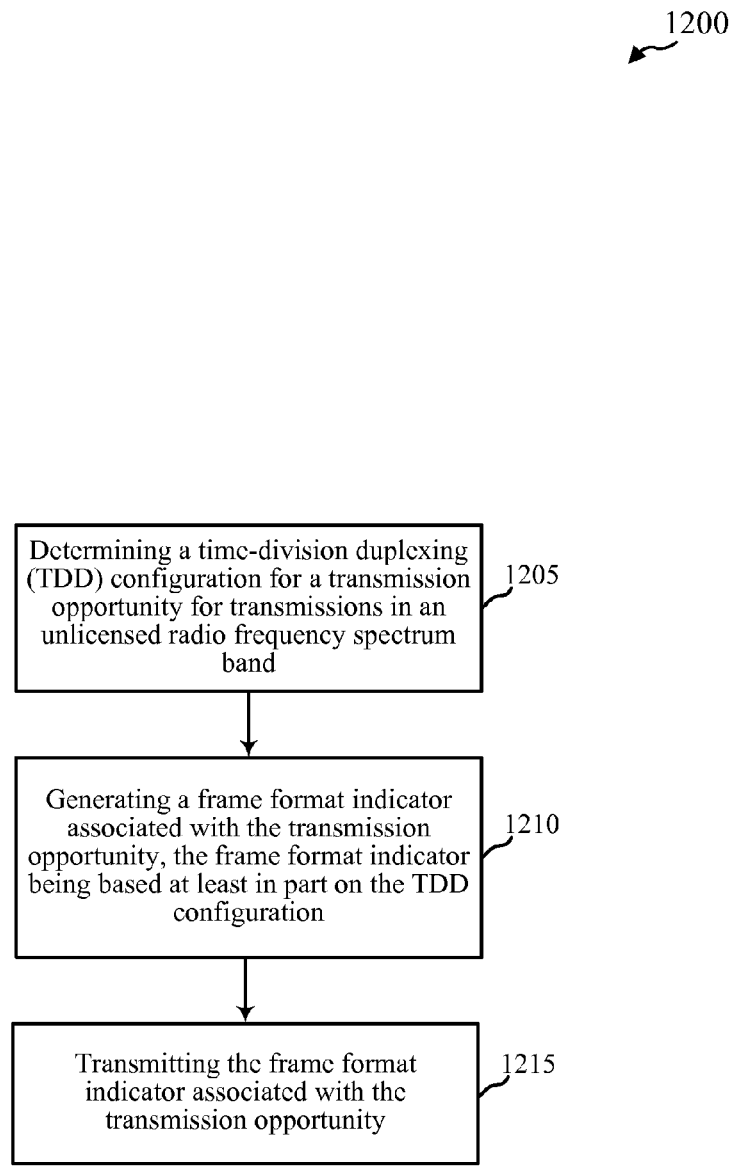
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the base stations described with reference to FIGS. 1-9. In some examples, a base station may execute one or more sets of codes to control the functional elements of the base station to perform the functions described below. Additionally or alternatively, the base station may perform one or more of the functions described below using special-purpose hardware.

At block 1205, the method 1200 may include determining a time-division duplexing (TDD) configuration for a transmission opportunity for transmissions in an unlicensed radio frequency spectrum band. At block 1210, the method 1200 may include generating a frame format indicator associated with the transmission opportunity, the frame format indicator being based at least in part on the TDD configuration. In some examples, generating the frame format indicator may include scrambling a codeword associated with the TDD configuration with a sequence. The scrambled codeword may be modulated with quadrature phase shift keying (QPSK), and mapped to space frequency block code (SFBC) symbols. The SFBC symbols may be mapped to an enhanced resource element group (eREG) of a resource block (RB). At block 1215, the method 1200 may include transmitting the frame format indicator associated with the transmission opportunity. The operations at blocks 1205, 1210, and 1215 may be performed using the base station frame format indicator component 820, 920, and/or 1020 described with reference to FIGS. 8, 9, and 10.

Thus, the method 1200 may provide for wireless communication. It should be noted that the method 1200 is just one implementation and that the operations of the method 1200 may be rearranged or otherwise modified such that other implementations are possible.

Figure 13:
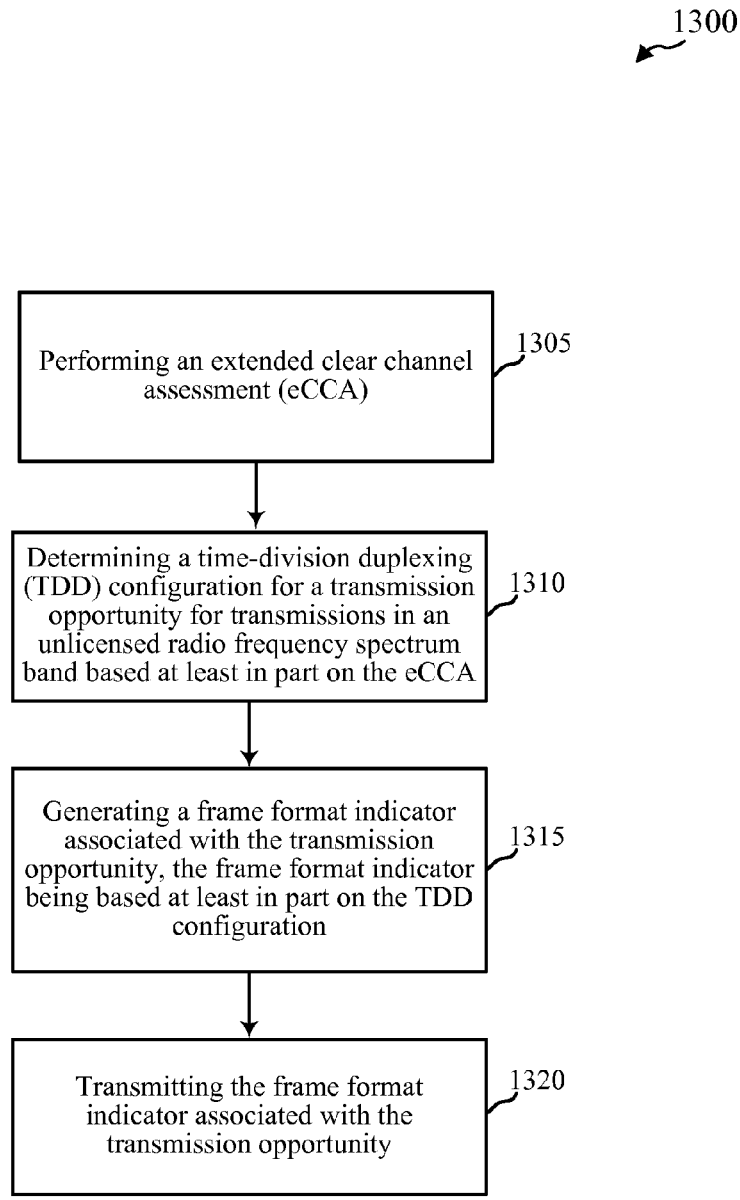
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the base stations described with reference to FIGS. 1-9. In some examples, a base station may execute one or more sets of codes to control the functional elements of the base station to perform the functions described below. Additionally or alternatively, the base station may perform one or more of the functions described below using special-purpose hardware.

At block 1305, the method 1300 may include performing an extended clear channel assessment (eCCA). At block 1310, the method 1300 may include determining a time-division duplexing (TDD) configuration for a transmission opportunity for transmissions in an unlicensed radio frequency spectrum band based at least in part on the eCCA. In some examples, the eCCA may be completed at least four subframes before an uplink subframe of the TDD configuration. At block 1315, the method 1300 may include generating a frame format indicator associated with the transmission opportunity, the frame format indicator being based at least in part on the TDD configuration. In some examples, generating the frame format indicator may include scrambling a codeword associated with the TDD configuration with a sequence. The scrambled codeword may be modulated with quadrature phase shift keying (QPSK), and mapped to space frequency block code (SFBC) symbols. The SFBC symbols may be mapped to an enhanced resource element group (eREG) of a resource block (RB). At block 1320, the method 1300 may include transmitting the frame format indicator associated with the transmission opportunity. The operations at blocks 1305, 1310, 1315, and 1320 may be performed using the base station frame format indicator component 820, 920, and/or 1020 described with reference to FIGS. 8, 9, and 10.

Thus, the method 1300 may provide for wireless communication. It should be noted that the method 1300 is just one implementation and that the operations of the method 1300 may be rearranged or otherwise modified such that other implementations are possible.

In some examples, aspects from two or more of the methods 1100, 1200, and/or 1300 may be combined. It should be noted that the methods 1100, 1200, and/or 1300 are just example implementations, and that the operations of the methods 1100, 1200, and/or 1300 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1λ, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
receiving, from a base station, a frame format indicator associated with a transmission opportunity for transmissions in an unlicensed radio frequency spectrum band, the frame format indicator indicating an available time-division duplexing (TDD) configuration, the available TDD configuration determined based at least in part on a clear channel assessment (CCA) associated with the transmission opportunity; and
determining a TDD configuration for the transmission opportunity based at least in part on the available TDD configuration indicated by the frame format indicator.

2. The method of claim 1, wherein the frame format indicator comprises a codeword associated with the TDD configuration.

3. The method of claim 2, further comprising:
receiving the frame format indicator in a bit stream, wherein the length of the bit stream is determined by a number of cyclical extensions of the codeword.

4. The method of claim 1, wherein the frame format indicator is carried by at least one enhanced resource element group (eREG) of a resource block (RB).

5. The method of claim 1, wherein the frame format indicator is multiplexed with a second frame format indicator from a second base station.

6. The method of claim 1, further comprising:
receiving the frame format indicator in a orthogonal frequency division multiplexing (OFDM) symbol before a downlink subframe of the transmission opportunity.

7. The method of claim 1, further comprising:
receiving the frame format indicator before a first subframe of the transmission opportunity.

8. The method of claim 1, further comprising:
receiving the frame format indicator during a middle portion of the transmission opportunity.

9. The method of claim 1, further comprising:
decoding the frame format indicator before an end of a first downlink subframe of the transmission opportunity.

10. The method of claim 1, further comprising:
receiving a second frame format indicator during a subframe of the transmission opportunity; and
invalidating the second frame format indicator based at least in part on which subframe the second frame format indicator is received.

11. The method of claim 1, wherein the TDD configuration comprises at least one of an uplink subframe corresponding to a cross-carrier grant from a primary cell, an uplink subframe corresponding to a self-scheduled uplink grant, a downlink subframe and an uplink subframe, or combinations thereof.

12. The method of claim 1, wherein the frame format indicator is received in an OFDM symbol comprising a channel usage beacon signal (CUBS).

13. A method for wireless communication, comprising:
performing a clear channel assessment (CCA) associated with a transmission opportunity for transmissions in an unlicensed radio frequency spectrum band;
determining, based at least in part on the CCA, a time-division duplexing (TDD) configuration for the transmission opportunity; and
transmitting, to a UE, a frame format indicator associated with the transmission opportunity, the frame format indicator indicating the determined TDD configuration.

14. The method of claim 13, wherein the frame format indicator comprises a codeword associated with the TDD configuration.

15. The method of claim 14, further comprising:
scrambling the codeword with a sequence associated with a base station.

16. The method of claim 15, further comprising:
modulating the scrambled codeword with quadrature phase shift keying (QPSK).

17. The method of claim 14, further comprising:
mapping the codeword to space frequency block code (SFBC) symbols associated with two antenna ports.

18. The method of claim 14, further comprising:
cyclically extending the codeword a number of times; and
transmitting the frame format indicator in a bit stream, wherein the length of the bit stream is determined by the number of cyclical extensions of the codeword.

19. The method of claim 13, further comprising:
multiplexing the frame format indicator with a second frame format indicator from a second base station.

20. The method of claim 13, further comprising:
transmitting the frame format indicator in a orthogonal frequency division multiplexing (OFDM) symbol before a downlink subframe of the transmission opportunity.

21. The method of claim 13, further comprising:
transmitting the frame format indicator before a first subframe of the transmission opportunity.

22. The method of claim 13, further comprising:
transmitting the frame format indicator during a middle portion of the transmission opportunity.

23. The method of claim 13, further comprising:
transmitting a second frame format indicator during a subframe of the transmission opportunity.

24. A method for wireless communication, comprising:
identifying a plurality of TDD configurations, wherein each of the plurality of TDD configurations comprises different numbers of uplink subframes and downlink subframes; and
identifying an available TDD configuration from the plurality of TDD configurations, wherein the available TDD configuration is indicated by a frame format indicator, and wherein an availability of the available TDD configuration is determined based at least in part on a clear channel assessment (CCA).

25. The method of claim 24, wherein each of the plurality of TDD configurations comprises ten subframes.

26. The method of claim 24, wherein each of the plurality of TDD configurations comprises at least one special subframe.

27. The method of claim 24, wherein a first subframe of each of the plurality of TDD configurations comprises a downlink subframe.

28. The method of claim 24, wherein a last subframe of each of the plurality of TDD configurations comprises a special subframe.

29. The method of claim 24, wherein the plurality of TDD configurations comprise:
- a first TDD configuration comprising one downlink subframe, a first special subframe, seven uplink subframes, and a second special subframe;
- a second TDD configuration comprising two downlink subframes, a first special subframe, six uplink subframes, and a second special subframe;
- a third TDD configuration comprising three downlink subframes, a first special subframe, five uplink subframes, and a second special subframe;
- a fourth TDD configuration comprising four downlink subframes, a first special subframe, four uplink subframes, and a second special subframe;
- a fifth TDD configuration comprising five downlink subframes, a first special subframe, three uplink subframes, and a second special subframe;
- a sixth TDD configuration comprising six downlink subframes, a first special subframe, two uplink subframes, and a second special subframe;
- a seventh TDD configuration comprising seven downlink subframes, a first special subframe, one uplink subframes, and a second special subframe; and
- an eighth TDD configuration comprising nine downlink subframes and a second special subframe.

30. An apparatus for wireless communication, comprising:
- a processor;
- memory in electronic communication with the processor; and
- instructions stored in the memory, the instructions being executable by the processor to:
- receive, from a base station, a frame format indicator associated with a transmission opportunity for transmissions in an unlicensed radio frequency spectrum band, the frame format indicator indicating an available time-division duplexing (TDD) configuration, the available TDD configuration determined based at least in part on a clear channel assessment (CCA) associated with the transmission opportunity; and
- determine a TDD configuration for the transmission opportunity based at least in part on the available TDD configuration indicated by the frame format indicator.

* * * * *

UNITED STATES PATENT AND TRADEMARK OFFICE
CERTIFICATE OF CORRECTION

PATENT NO. : 9,509,486 B2  
APPLICATION NO. : 14/807069  
DATED : November 29, 2016  
INVENTOR(S) : Yerramalli et al.

Page 1 of 2

It is certified that error appears in the above-identified patent and that said Letters Patent is hereby corrected as shown below:

In the Claims

Claim 1: at Column 39, Line 16, please insert, --at a user equipment (UE)-- after "A method for wireless communication";
    at Column 39, Line 23, please insert, --a result of-- after "in part on";
    at Column 39, Line 24, please insert, --in the unlicensed radio frequency spectrum band-- and delete, "and" after "transmission opportunity";
    at Column 39, Line 25, please insert, --, by the UE,-- after "determining";
    at Column 39, Line 27, please insert, --; and communicating with the base station in the unlicensed radio frequency spectrum band based at least in part on the determined TDD configuration-- after "frame format indicator".

Claim 3: at Column 39, Line 33, please change, "the length of the bit stream" to "a length of the bit stream" after "wherein".

Claim 13: at Column 40, Line 8, please insert, --a result of-- after "at least in part on";
    at Column 40, Line 10, please insert, --in the unlicensed radio frequency spectrum band-- after "transmission opportunity";
    at Column 40, Line 11, please change, "UE" to "user equipment (UE)" after "transmitting, to a";
    at Column 40, Line 13, please insert, --for the transmission opportunity in the unlicensed radio frequency spectrum band-- after "TDD configuration".

Claim 18: at Column 40, Line 30, please change, "the length of the bit stream" to "a length of the bit stream" after "wherein".

Claim 24: at Column 40, Line 54, please insert, --, for a transmission opportunity in an unlicensed radio frequency spectrum band,-- after "identifying";

Signed and Sealed this  
Twenty-ninth Day of August, 2017

Joseph Matal  
*Performing the Functions and Duties of the*  
*Under Secretary of Commerce for Intellectual Property and*  
*Director of the United States Patent and Trademark Office* at Column 40, Line 57, please delete, "an availability of" after "and wherein";

at Column 40, Line 59, please insert, --a result of-- after "on";

at Column 40, Line 59, please insert, --; and communicating in the unlicensed radio frequency spectrum band based at least in part on the available TDD configuration-- after "a clear channel assessment (CCA)".

Claim 30: at Column 42, Line 19, please insert, --a result of-- after "in part on";

at Column 42, Line 20, please insert, --in the unlicensed radio frequency spectrum band-- after "transmission opportunity";

at Column 42, Line 20, please delete, "and" after "transmission opportunity";

at Column 42, Line 23, please insert, --; and communicate with the base station in the unlicensed radio frequency spectrum band based at least in part on the determined TDD configuration-- after "frame format indicator".